United States Patent [19]
Kane et al.

[11] Patent Number: 5,220,610
[45] Date of Patent: Jun. 15, 1993

[54] SPEECH SIGNAL PROCESSING APPARATUS FOR EXTRACTING A SPEECH SIGNAL FROM A NOISY SPEECH SIGNAL

[75] Inventors: Joi Kane, Nara; Akira Nohara, Nishinomiya, both of Japan

[73] Assignee: Matsushita Electric Industrial Co., Ltd., Osaka, Japan

[21] Appl. No.: 706,573

[22] Filed: May 28, 1991

[30] Foreign Application Priority Data

| May 28, 1990 | [JP] | Japan | 2-138054 |
| May 28, 1990 | [JP] | Japan | 2-138055 |
| May 28, 1990 | [JP] | Japan | 2-138059 |
| May 28, 1990 | [JP] | Japan | 2-138060 |

[51] Int. Cl.$^5$ .............................................. G10L 5/00
[52] U.S. Cl. .................................................... 381/46
[58] Field of Search ....................................... 381/46

[56] References Cited

U.S. PATENT DOCUMENTS

| 4,286,116 | 8/1981 | Sadou | 381/47 |
| 4,959,865 | 9/1990 | Stettiner | 381/46 |

FOREIGN PATENT DOCUMENTS

| 0099476A2 | of 0000 | European Pat. Off. |
| 0123349A1 | of 0000 | European Pat. Off. |
| WO87/00366 | 1/1987 | PCT Int'l Appl. |
| WO86/04294 | 7/1987 | PCT Int'l Appl. |
| WO88/07739 | 10/1988 | PCT Int'l Appl. |

OTHER PUBLICATIONS

"Cepstrum Pitch Determination", A. Michael Noll, The Journal of the Acoustical Society of America, vol. 41, No. 2, 1967, pp. 293-309.
"Separationof Speech from Interfering Speech by Means of Harmonic Selection", Thomas W. Parson, J. Acoust. Soc. Am., vol. 60, No. 4, Oct. 1976, pp. 911-918.

*Primary Examiner*—Emanuel S. Kemeny
*Attorney, Agent, or Firm*—Wenderoth, Lind & Ponack

[57] ABSTRACT

A signal processing apparatus extracts a speech signal from an inputted noisy speech signal. In the signal processing apparatus, a band division process including a Fourier transformation is performed for an inputted speech signal, thereby outputting spectrum signals of plural channels, and a cepstrum analysis process is performed for the spectrum signals of plural channels, thereby outputting a cepstrum analysis result. Thereafter, a speech signal interval of the inputted noisy speech signal is detected in response to the cepstrum analysis result, and then, a speech signal is extracted from the inputted noisy speech signal according to the detected speech signal interval.

13 Claims, 21 Drawing Sheets

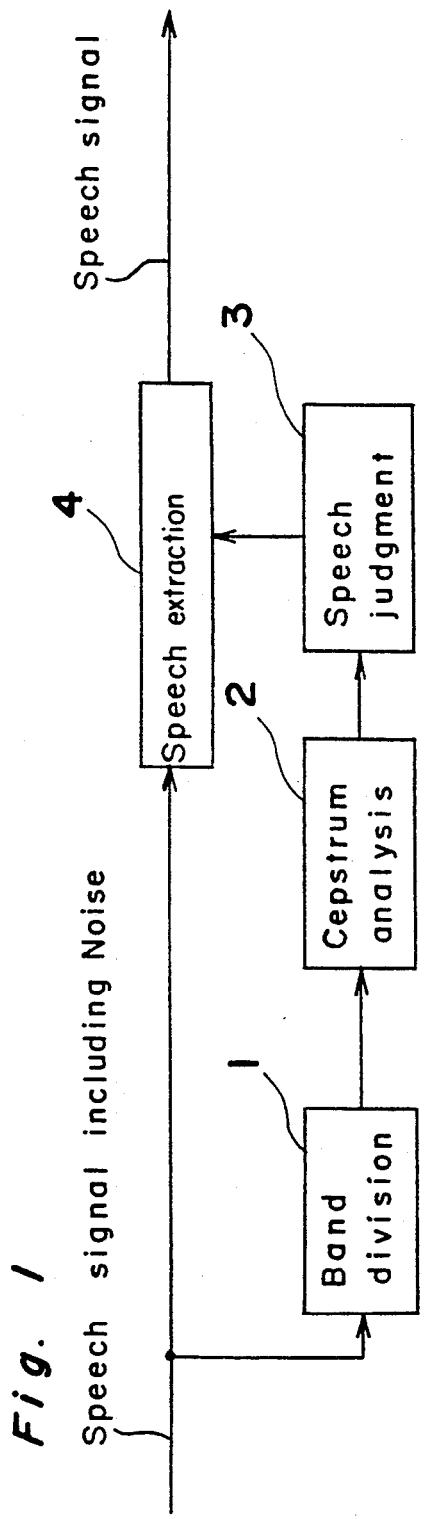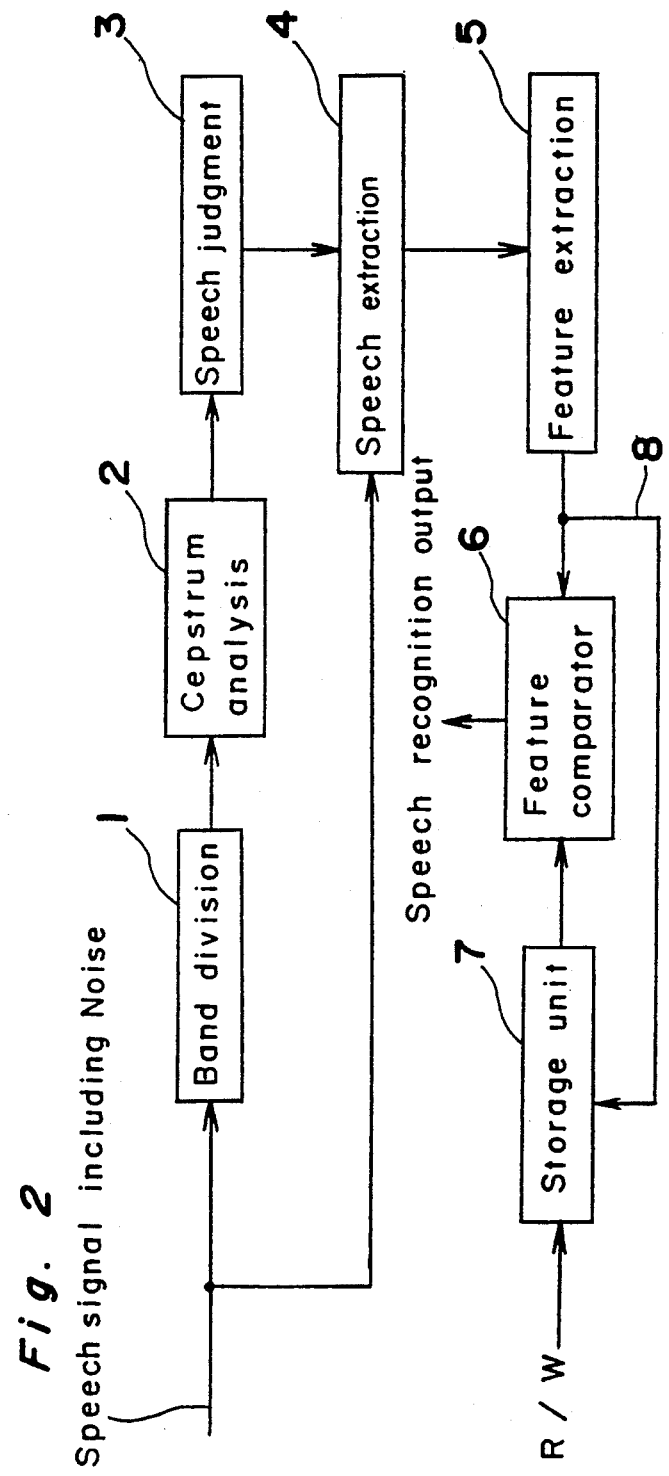

Input signal

Predicted noise signal

Output signal

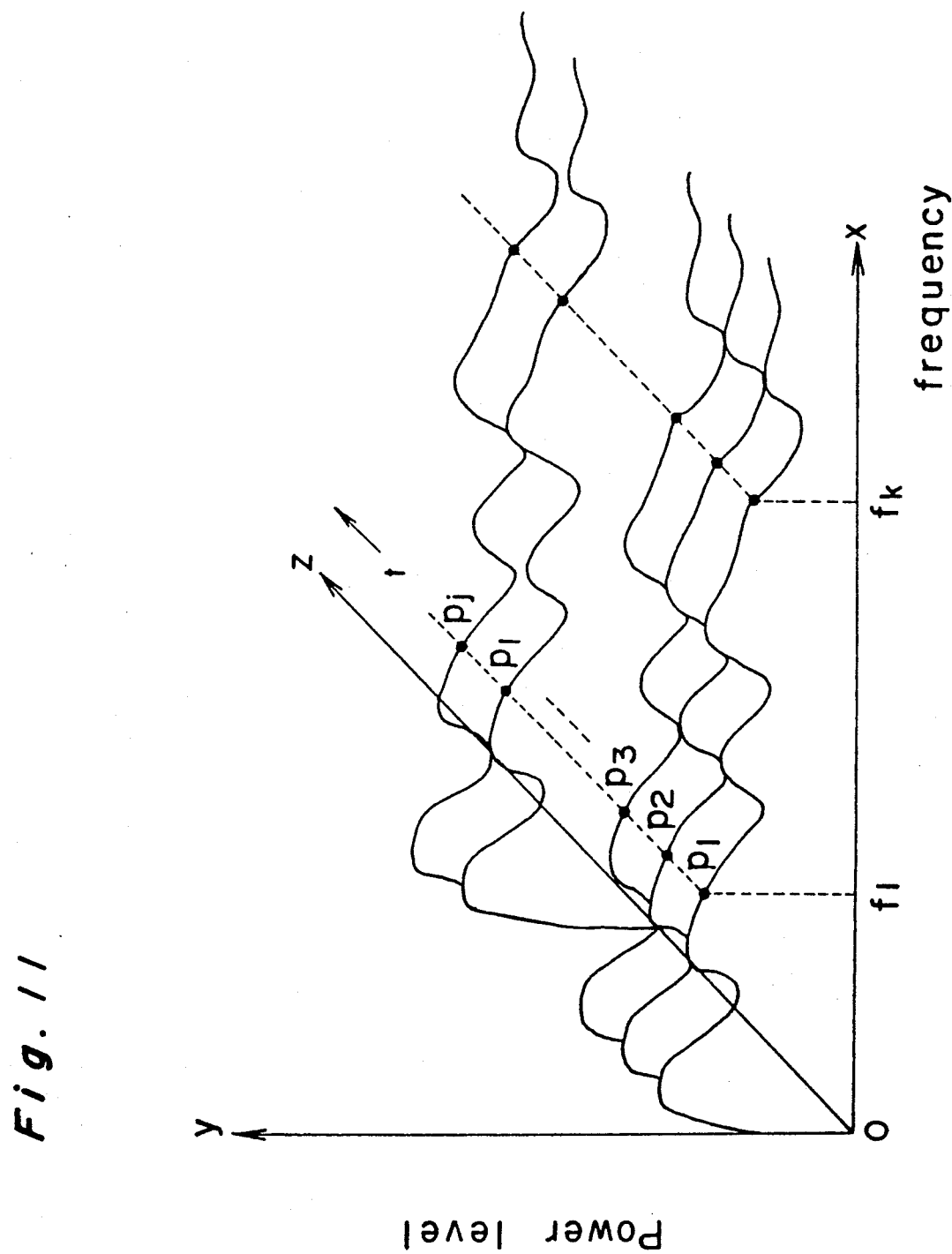

Input signal

Spectrum of input signal

⇓ Fourier transformation

Spectrum of Predicted noise

Spectrum of output signal

Output signal

⇓ Inverse Fourier transformation

SPEECH SIGNAL PROCESSING APPARATUS FOR EXTRACTING A SPEECH SIGNAL FROM A NOISY SPEECH SIGNAL

BACKGROUND OF THE INVENTION

1. Field of the Invention

The present invention relates to a speech signal processing apparatus, and more particularly, to a speech signal cutting-out apparatus for cutting out a speech signal from a noisy speech signal, a speech recognition apparatus for recognizing speech from an extracted speech signal, and a signal processing apparatus disposed ahead of a speech recognition apparatus.

2. Description of the Prior Art

In a conventional speech recognition apparatus, a speech signal is filtered from a noisy speech signal by a filter, and then, speech is recognized by a pattern matching method (See, for example, Japanese Laid-open Patent Publication (JP-A) No. 59-121099/1984 and the Japanese Laid-open Patent Publication (JP-A) No. 62-179000/1987). However, in the conventional speech recognition apparatus of this type, since a speech signal is filtered by the filter and noise included in the speech signal can not be completely removed from a noisy speech signal, a recognition rate for recognizing a speech is relatively low. In particular, when a speech signal including a large noise component is recognized by the conventional speech recognition apparatus, there is a problem in that the recognition rate is extremely low.

FIG. 22 shows a conventional speech signal processing apparatus.

Referring to FIG. 22, the conventional speech recognition apparatus comprises a speech detection section 451 for detecting a speech signal interval from an inputted noisy speech signal, a noise interval judgment section 452 for detecting a noise interval based on the speech signal interval detected by the speech detection section 451, a muting controller 453 for generating a control signal for muting a noisy speech signal for the detected noise interval in response to the noise interval detected by the noise interval judgment section 452 and a muting section 454 for muting the inputted noisy speech signal for the detected noise interval according to the muting control signal outputted from the muting controller 453.

In the conventional speech signal processing apparatus shown in FIG. 22, a speech signal interval is detected by the speech detection section 451, and the noise interval judgment section 452 detects a noise interval by inverting the speech signal interval detected by the speech detection section 451. Furthermore, the muting controller 453 generates the muting control signal for a noise interval detected by the noise interval judgment section 452, and then, an inputted noisy speech signal is attenuated only for the detected noise interval by the muting section 454.

However, in the conventional speech signal processing apparatus of this type, noise is not sufficiently suppressed from a noisy speech signal, and also a recognition rate for recognizing a speech is extremely low.

SUMMARY OF THE INVENTION

The object of the present invention is to provide a signal processing apparatus for extracting a speech signal from an inputted noisy speech signal.

Another object of the present invention is to provide a signal processing apparatus for canceling noise from an inputted speech signal and for extracting a speech signal in response to the noise-canceled speech signal.

A further object of the present invention is to provide a signal processing apparatus for effectively suppressing noise in an inputted noisy speech signal.

A still further object of the present invention is to provide a signal processing apparatus for canceling noise in an inputted noisy speech signal and for further attenuating noise in the noise-canceled speech signal.

In order to achieve the aforementioned objective, according to one aspect of the present invention, there is provided a signal processing apparatus comprising:

a band division means for performing a band division process including a Fourier transformation for an inputted speech signal and for outputting spectrum signals of plural channels;

a cepstrum analysis means for performing a cepstrum analysis process for the spectrum signals of plural channels outputted from said band division means and for outputting a cepstrum analysis result;

a speech judgment means for detecting a speech signal interval of the inputted noisy speech signal in response to the cepstrum analysis result outputted from said cepstrum analysis means and for outputting the detected speech signal interval; and a speech extracting means for extracting a speech signal from the inputted noisy speech signal according to the detected speech signal interval outputted from said speech judgment means, and for outputting the extracted speech signal.

According to another aspect of the present invention, said signal processing apparatus further comprises:

a feature extraction means for extracting a speech feature from the extracted speech signal outputted from said speech extracting means, and for outputting the extracted speech feature;

a storage means for previously storing standard speech features of plural speakers; and a feature comparison means for recognizing speech by comparing the extracted speech features of the speech outputted from said feature extraction means with the standard speech features speech stored in said storage means.

According to a further aspect of the present invention, there is provided a signal processing apparatus comprising:

a speech detection means for detecting a speech signal in response to an inputted noisy speech signal, and for outputting the detected speech signal;

a noise prediction means for predicting speech noise in response to the inputted noisy speech signal according to the detected speech signal outputted from said speech detection means, and for outputting the predicted noise;

a cancellation means for canceling the predicted noise outputted from said noise prediction means from the inputted noisy speech signal, and for outputting the noise-canceled speech signal; and a speech extracting means for extracting a speech signal from the noise-canceled speech signal outputted from said cancellation means according to the detected speech signal outputted from said speech detection means.

According to a still further aspect of the present invention, there is provided a signal processing apparatus comprising:

a band division means for performing a band division process including a Fourier transformation for an inputted speech signal and for outputting spectrum signals of plural channels;

a cepstrum analysis means for performing a cepstrum analysis process for the spectrum signals of plural channels outputted from said band division means, and for outputting the cepstrum analysis result;

a speech judgment means for detecting a speech signal interval in response to the cepstrum analysis result outputted from said cepstrum analysis means, and for outputting the detected speech signal interval;

a noise interval judgment means for detecting a noise interval in response to the detected speech signal interval outputted from said speech judgment means; and a muting means for attenuating the inputted noisy speech signal only for the detected noise interval outputted from said noise interval judgment means according to the detected noise interval outputted from said noise interval judgment means, and for outputting the speech signal attenuated only for the detected noise interval.

According to a still more further aspect of the present invention, there is provided a signal processing apparatus comprising:

a storage means for previously storing speech features of plural speakers;

a speech detection means for detecting a speech signal in response to an inputted noisy speech signal, and outputting the detected speech signal interval;

a maximum likelihood estimation means for detecting a kind of speech by comparing the detected feature of the speech signal outputted from said speech detection means with the speech features of plural speakers stored in said storage means, and for outputting the detected kind of speech;

a noise interval judgment means for detecting a noise interval in response to the detected kind of the speech outputted from said maximum likelihood estimation means and the detected speech signal interval outputted from said speech detection means, and for outputting the detected noise interval; and a muting means for attenuating the inputted noisy speech signal only for the detected noise interval outputted from said noise interval judgment means according to the detected noise interval outputted from said noise interval judgment means, and for outputting the speech signal attenuated only for the detected noise interval.

According to a more still further aspect of the present invention, there is provided a signal processing apparatus comprising:

a speech detection means for detecting a speech signal interval in response to an inputted noisy speech signal and for outputting the detected speech signal interval;

noise interval judgment means for detecting a noise interval in response to the detected speech signal interval outputted from said speech detection means and for outputting the detected noise interval;

a noise prediction means for predicting a noise of the inputted noisy speech signal interval in response to the detected noise interval outputted from said noise interval judgment means, and for outputting the predicted noise;

a cancellation means for canceling the predicted noise outputted from said noise prediction means in the inputted noisy speech signal and for outputting a noise-canceled speech signal; and a muting means for attenuating the noise-canceled speech signal outputted from said cancellation means, only for the detected noise interval outputted from said noise interval judgment means with a predetermined attenuation value according to the detected noise interval outputted from said noise interval judgment means, and for outputting the speech signal attenuated only for the detected noise interval.

According to a more still more further aspect of the present invention, there is provided a signal processing apparatus comprising:

a band division means for performing a band division process including a Fourier transformation for an inputted speech signal and for outputting spectrum signals of plural channels;

a cepstrum analysis means for performing a cepstrum analysis process for the spectrum signals of plural channels outputted from said band division means, and for outputting the cepstrum analysis result;

a speech judgment means for detecting a speech signal interval in response to the cepstrum analysis result outputted from said cepstrum analysis means and for outputting the detected speech signal interval;

a noise interval judgment means for detecting a noise interval in response to the detected speech signal interval outputted from said speech judgment means and for outputting the detected noise interval;

a noise prediction means for predicting noise of the spectrum signals of plural channels outputted from said band division means in response to the detected noise interval outputted from said noise interval judgment means, and for outputting the predicted noise of plural channels;

a cancellation means for canceling the predicted noise of plural channels outputted from said noise prediction means in the spectrum signals of plural channels outputted from said band division means, and for outputting noise-canceled spectrum signals of plural channels;

a band combining means for combining the noise-canceled spectrum signals of plural channels, inverse-Fourier-transforming the combined spectrum signal into a transformed speech signal, and for outputting the transformed speech signal; and a muting means for attenuating the transformed speech signal outputted from said band combining means, only for the detected noise interval outputted from said noise interval judgment means with a predetermined attenuation value according to the detected noise interval outputted from said noise interval judgment means, and for outputting the speech signal attenuated only for the detected noise interval.

BRIEF DESCRIPTION OF THE DRAWINGS

These and other objects and features of the present invention will become clear from the following description taken in conjunction with the preferred embodiments thereof with reference to the accompanying drawings throughout which like parts are designated by like reference numerals, and in which:

FIG. 1 is a schematic block diagram showing a signal processing apparatus of a first preferred embodiment according to the present invention;

FIG. 2 is a schematic block diagram showing a speech recognition apparatus of a second preferred embodiment according to the present invention;

FIG. 11 is a graph for showing a noise prediction method used in the preferred embodiments;

DETAILED DESCRIPTION OF THE PREFERRED EMBODIMENTS

The preferred embodiments according to the present invention will be described below with reference to the attached drawings.

THE FIRST PREFERRED EMBODIMENT

FIG. 1 shows a signal processing apparatus of a first preferred embodiment according to the present invention.

Referring to FIG. 1, the signal processing apparatus of the first preferred embodiment comprises a band division section 1, a cepstrum analysis section 2, a speech judgment section 3 and a speech extraction section 4.

The band division section 1 comprises: an analog to digital converter for converting an inputted noisy analog speech signal into a digital speech signal; a Fourier transformer for Fourier-transforming the converted digital speech signal into a spectrum signal, and a band divider for dividing the transformed spectrum signal into spectrum signals of plural channels, wherein the divided spectrum signals of plural channels respectively have predetermined bandwidths and predetermined bands which are different from each other.

The cepstrum analysis section 2 performs a cepstrum analysis for the spectrum signals of plural channels inputted from the band division section 1 so as to obtain a cepstrum, and outputs the obtained cepstrum. In the cepstrum analysis, a logarithm of each of the spectrum signals of plural channels is calculated, and the calculated logarithm is inverse-Fourier-transformed, thereby obtaining a cepstrum of each of the spectrum signals of plural channels.

Figure 3:
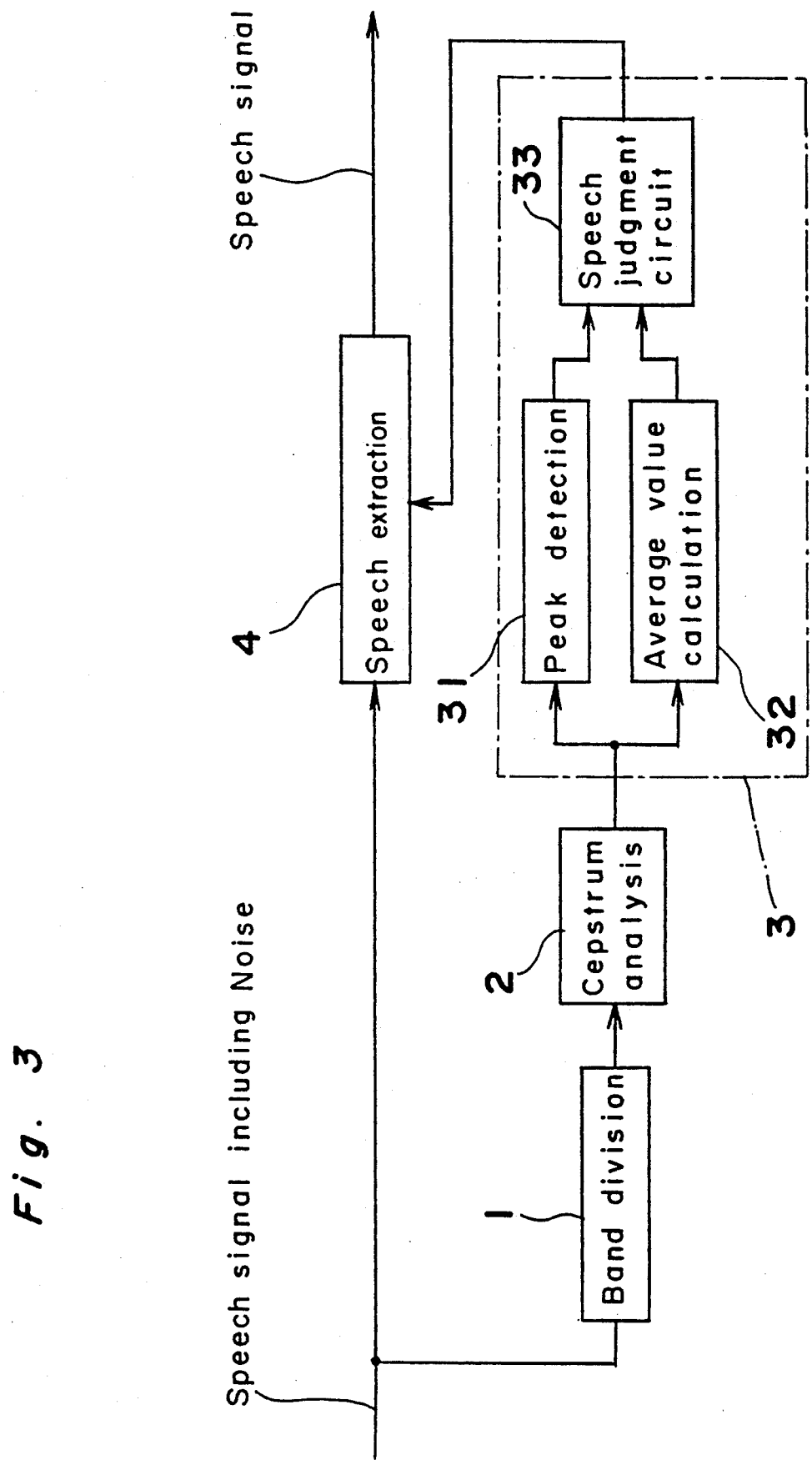
FIG. 3 is a schematic block diagram showing a signal processing apparatus of a preferred embodiment according to the present invention in the case of concretely showing a speech judgment section.

The speech judgment section 3 detects a speech signal interval in response to the cepstrum outputted from the cepstrum analysis section 2. Concretely, as shown in FIG. 3, the speech judgment section 3 comprises a peak detection section 31, an average value calculation section 32 and a speech judgment circuit 33. The peak detection section 31 detects a peak or a pitch in the cepstrum obtained by the cepstrum analysis section 2, and outputs the detected peak to the speech judgment circuit 33. On the other hand, the average value calculation section 32 calculates an average value of respective values of the cepstrum on a quefrency which is obtained by the cepstrum analysis section 2, and outputs the calculated average value to the speech judgment circuit 33. Further, the speech judgment circuit 33 detects a speech signal interval in response to the peak outputted from the peak detection section 31 and the average value of the cepstrum outputted from the average value calculation section 32. For example, the speech judgment circuit 33 certainly detects a speech signal interval by detecting a vowel and a consonant of a speech of the inputted noisy speech signal in response to the inputted peak and the average value thereof. Namely, when the speech judgment circuit 33 receives a signal representing that a peak has been detected, the speech judgment circuit 33 judges that the inputted noisy speech signal includes a speech of a vowel or the noisy speech signal of a vowel is inputted to the signal processing apparatus. On the other hand, upon detecting a consonant of a speech, for example, when the average value of the cepstrum inputted from the average value calculation section 32 to the speech judgment circuit 33 is larger than a predetermined threshold value or an increasing quantity or a differential coefficient of the average value of the cepstrum inputted as described above is larger than a predetermined threshold value, the speech judgment circuit 33 judges that the inputted noisy speech siganl includes a speech of a consonant or the noisy speech signal of a consonant is inputted to the signal processing apparatus. Then, the speech judgment circuit 33 outputs a signal representing a vowel and/or a consonant to the speech extraction section 4. Alternatively, the speech judgment circuit 33 may output a signal representing a speech signal interval including a vowel and/or a consonant to the speech extractor section 4.

The speech extraction section 4 extracts a speech signal only for a speech signal interval in response to the inputted noisy speech signal according to the signal outputted from the speech judgment section 3, and outputs an extracted speech signal for the detected speech signal interval.

An operation of the signal processing apparatus of the first preferred embodiment will be described below in detail.

A noisy speech signal is inputted to the band division section 1, and the band division section 1 performs the band division process including a Fourier transformation for the inputted noisy speech signal, and outputs band-divided spectrum signals of plural channels to the cepstrum analysis section 2. The cepstrum analysis section 2 performs the cepstrum analysis process for the inputted spectrum signals of plural channels, and outputs a cepstrum analysis result to the speech judgment section 3. The speech judgment section 3 detects a speech signal interval in response to the cepstrum analysis result outputted from the cepstrum analysis section 2, and outputs the detection result to the speech extraction section 4. The speech extraction section 4, extracts only a speech signal in response to the noisy speech signal according to the detection result outputted from the speech judgment section 3, more correctly, and outputs an extracted speech signal.

THE SECOND PREFERRED EMBODIMENT

FIG. 2 shows a speech recognition apparatus of a second preferred embodiment according to the present invention. In FIG. 2, the same elements as those shown in FIG. 1 are denoted by the same reference numerals as those shown in FIG. 1.

The speech recognition apparatus of the second preferred embodiment further comprises a feature extraction section 5, a feature comparator 6 and a storage unit 7 in addition to the first preferred embodiment shown in FIG. 1.

Referring to FIG. 2, the feature extraction section 5 extracts speech features of an extracted speech signal such as a syllable in the speech signal extracted by the speech extraction section 4, and outputs the extracted speech features to the feature comparator 6. The feature comparator 6 recognizes a kind of the syllable of the cut-out speech signal by comparing the extracted speech features outputted from by the feature extraction section 5 with predetermined standard feature such as syllables which are previously stored in the storage unit 7. In order to previously store the standard features as indicated by a reference 8, speech features are stored in the storage unit 7 which are outputted from the feature extraction section 5 when a known speech signal of a speaker is inputted to the band division section 1 and the speech extraction section 4.

In the speech recognition apparatus of the second preferred embodiment, since a speech signal is correctly extracted from an inputted noisy speech signal, the recognition rate can be increased.

THE THIRD PREFERRED EMBODIMENT

Figure 4:
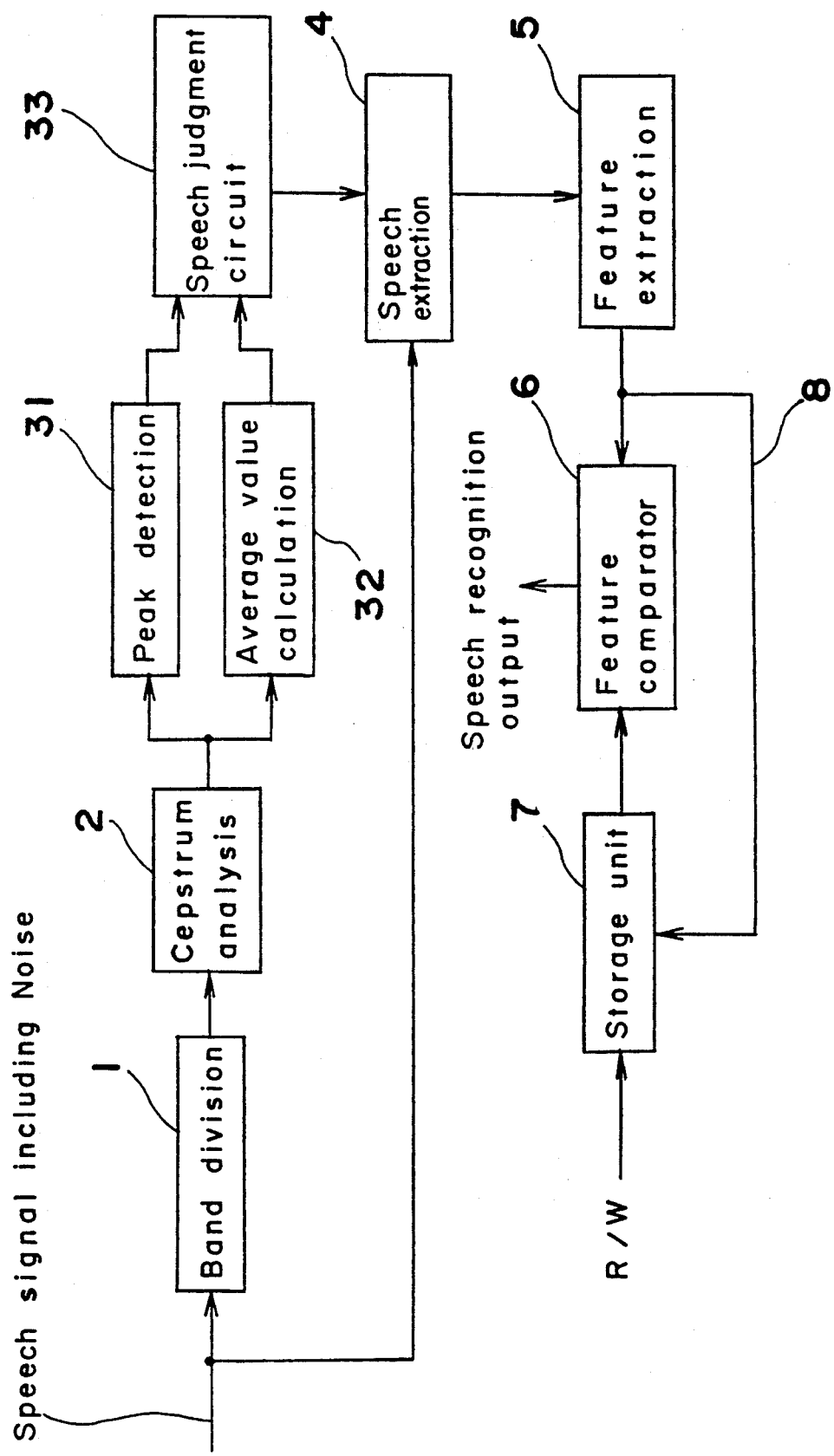
FIG. 4 is a schematic block diagram showing a speech recognition apparatus of a third preferred embodiment according to the present invention.
Figure 5A:
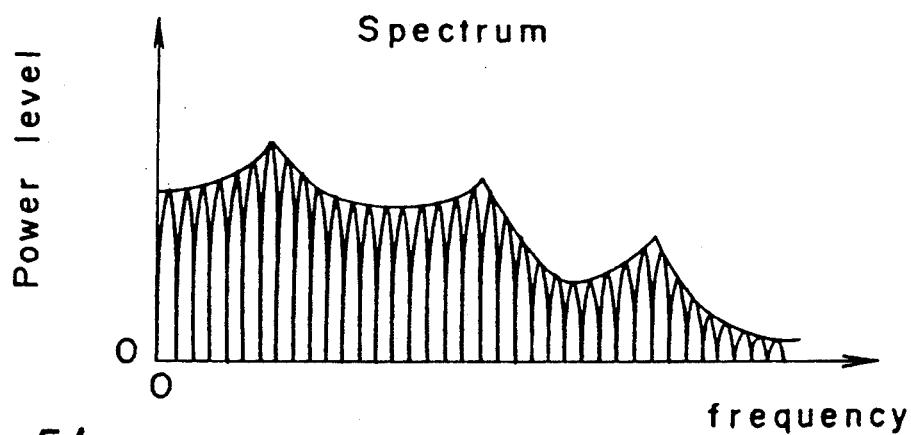
FIGS. 5a and 5b are graphs showing a cepstrum analysis used in the preferred embodiments.
Figure 5B:
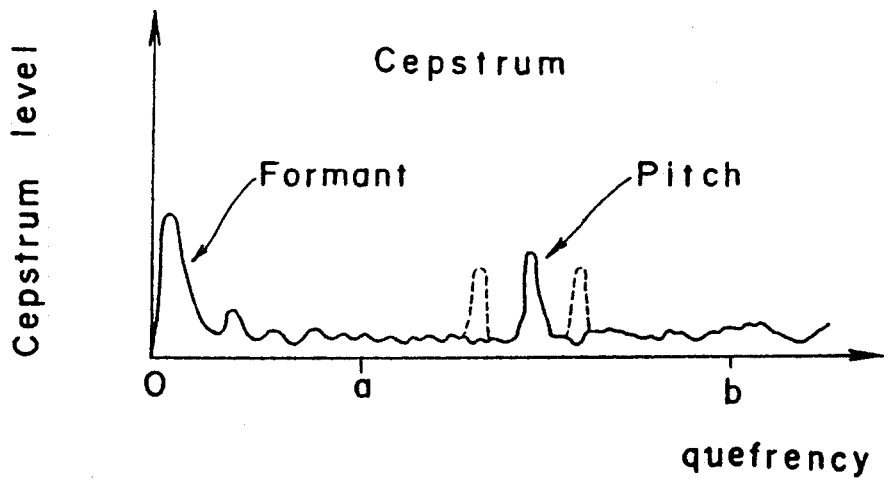

FIG. 4 is a schematic block diagram showing a speech recognition apparatus of a third preferred embodiment according to the present invention. In FIG. 4, the same elements shown in FIGS. 1 to 3 are denoted by the same numerals shown in FIGS. 1 to 3.

The speech recognition apparatus of the third preferred embodiment includes a combination of the signal processing apparatus of the second preferred embodiment shown in FIG. 2 and the speech recognition apparatus of the third preferred embodiment shown in FIG. 4. In the speech recognition apparatus, the speech judgment section 3 comprises the peak detection section 31, the average value calculation section 32 and the speech judgment circuit 33. The speech recognition apparatus recognizes speech in response to a speech signal extracted by the speech extraction section 4.

THE FOURTH PREFERRED EMBODIMENT

Figure 6:
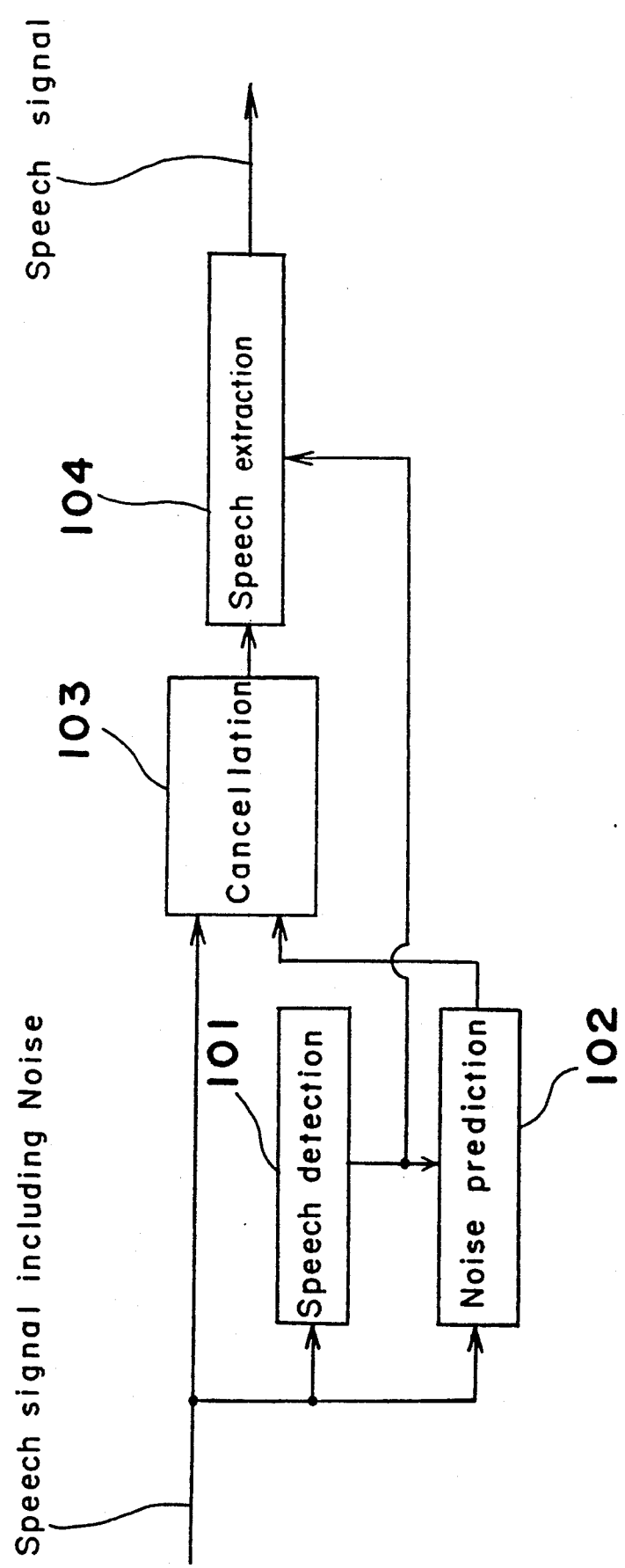
FIG. 6 is a schematic block diagram showing a signal processing apparatus of a fourth preferred embodiment according to the present invention.

FIG. 6 is a schematic block diagram showing a signal processing apparatus of a fourth preferred embodiment according to the present invention.

The signal processing apparatus of the fourth preferred embodiment comprises a speech detection section 101, a noise prediction section 102, a cancellation section 103 and a speech extraction section 104, as shown in FIG. 6.

A noisy speech signal is inputted to the speech detection section 101, the noise prediction section 102 and the cancellation section 103. The speech detection section 101 detects a speech signal interval in response to the inputted noisy speech signal. The speech detection section 101 includes a filter for filtering a speech signal and discriminates between a speech signal interval and a noise interval.

The noise prediction section 102 judges as a noise interval a time interval other than the speech signal interval detected by the speech detection section 101, predicts a noise in the inputted noisy speech signal for the judged speech signal interval by utilizing the noise data for the noise interval, and outputs the predicted noise to the cancellation section 103.

Figure 10A:
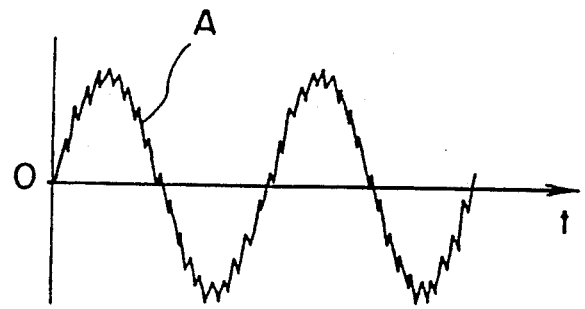
FIGS. 10(a)-10(c) are diagrams showing waveforms for explaining a noise cancellation method on a time axis used in the preferred embodiments.
Figure 10B:
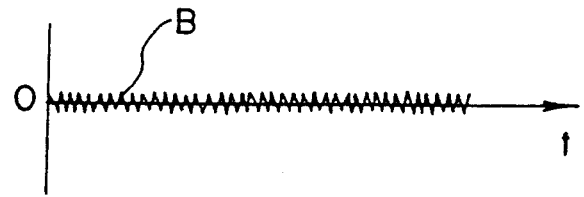
Figure 10C:
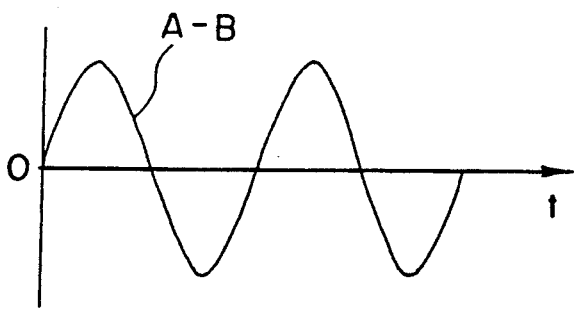

The cancellation section 103 cancels the predicted noise outputted from the noise prediction section 102 in the inputted noisy speech signal, and outputs a noise-canceled speech signal to the speech cutting-out section 104. FIGS. 10(a)–10(c) show a cancellation method on a time axis used in the cancellation section 103. As shown in FIGS. 10(a)–10(c), the predicted noise of FIG. 10(b) is subtracted from an inputted noisy speech signal, thereby obtaining the speech signal of FIG. 10(c).

Further, the speech extraction section 104 extracts a speech signal in the noise-canceled speech signal outputted from the cancellation section 103 according to the detected speech signal interval outputted from the speech detection section 101, and outputs an extracted speech signal.

THE FIFTH PREFERRED EMBODIMENT

Figure 7:
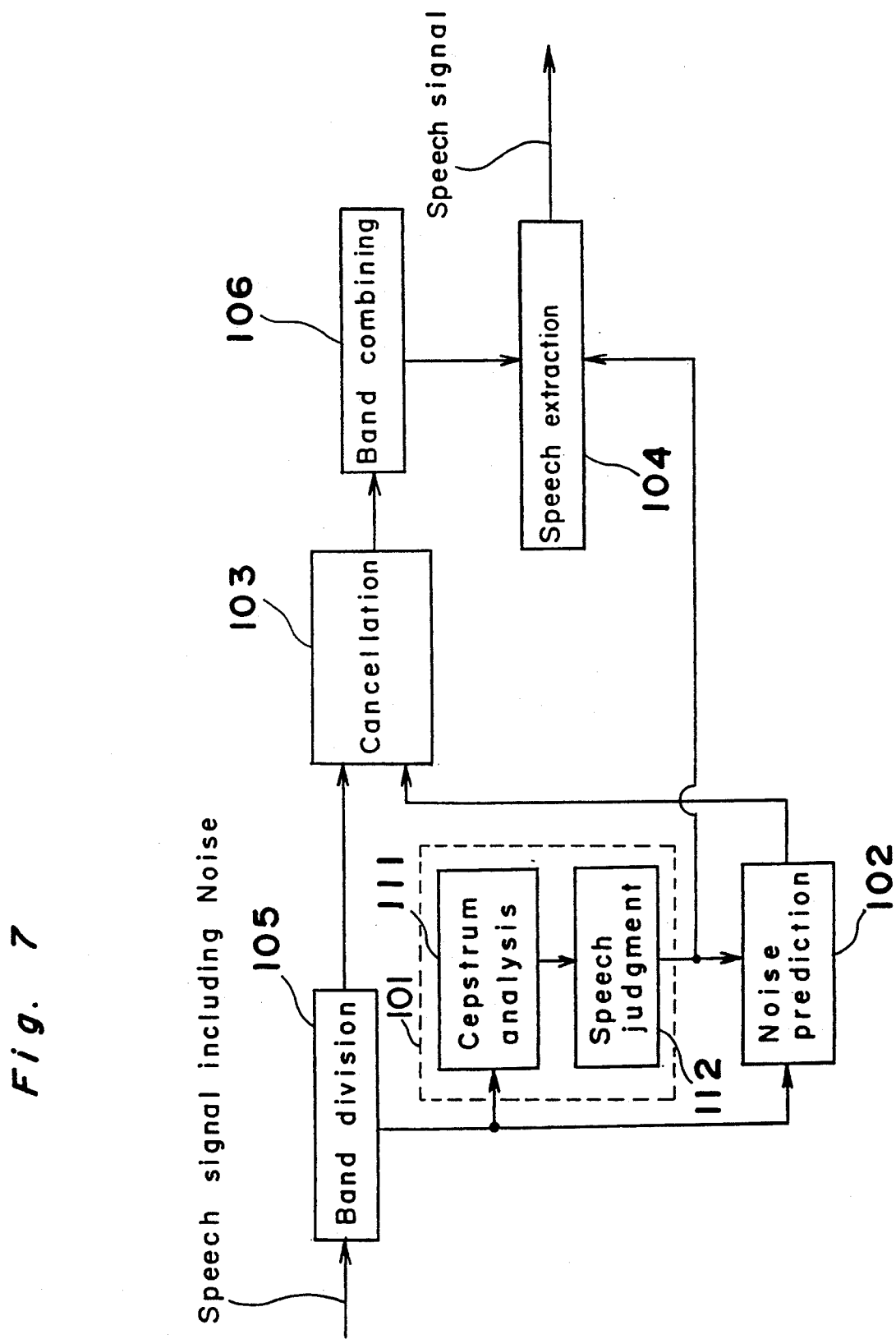
FIG. 7 is a schematic block diagram showing a signal processing apparatus of a fifth preferred embodiment according to the present invention.

FIG. 7 shows a signal processing apparatus of a fifth preferred embodiment according to the present invention. In FIG. 7, the same elements shown in FIGS. 1 and 6 are denoted by the same reference numerals shown in FIGS. 1 and 6.

The signal processing apparatus of the fifth preferred embodiment comprises a band division section 105, a speech detection section 101 including a cepstrum analysis section 111 and a speech judgment section 112, a cancellation section 103, a band combining section 106 and a speech extraction section 104.

Referring to FIG. 7, the band division section 105 performs a band division process including a Fourier transformation for an inputted noisy speech signal. For example, the band division section 105 comprises an analog to digital converter for converting an inputted noisy analog speech signal into a digital noisy speech signal, a Fourier transformer for Fourier-transforming the converted digital noisy speech signal into a transformed spectrum signal, and a band divider for dividing the transformed spectrum signal into spectrum signals of plural m channels, which have predetermined bandwidths and are composed of frequency bands different from each other. Then, the band division section 105 outputs the obtained spectrum signals of plural m channels to the cancellation section 103, the cepstrum analysis 111 and the noise prediction section 102.

The cepstrum analysis section 111 and the speech judgment section 112 of the speech detection section 101 are constituted in manners similar to the cepstrum analysis section 2 and the speech judgment section 3 which are used in the second preferred embodiment shown in FIG. 2. Concretely, the speech detection section 101 comprises the peak detection section 31, the average value calculation section 32 and the speech judgment section 33, as shown in FIG. 3. Then, the speech judgment circuit 112 outputs a signal representing a vowel and/or a consonant to the speech extraction section 104. Alternatively, the speech judgment circuit 112 may output a signal representing a speech signal interval including a vowel and/or a consonant to the speech extraction section 104.

As described above, the noisy spectrum signals of plural channels are inputted to the noise prediction section 102. Since a portion where there is no speech is a portion where there is only noise (referred to as a noise alone portion hereinafter), the noise prediction section 102 predicts a noise component of speech based on data of the noise portion alone. Namely, the noise prediction section 102, for example, predicts a noise component by respective channels based on the noisy speech signal which are divided into plural m band channels.

FIG. 11 shows one example of a noise prediction method. In FIG. 11, the x-axis denotes frequency, the y-axis notes a power level of an inputted speech signal, and the z-axis denotes a time. In frequency f1, there is data p1, p2, . . . , pi as elapses time, and then, data pj occurring after data pi on line of data p1, p2, . . . , pi is predicted. For example, an average value of noise data p1 to pi is calculated, and then, the calculated average value is set at a predicted value pj. Alternatively, when a speech signal continuously exits, data pj is multiplied by an attenuation factor, and then, the product of the data pj and the attenuation factor is set at a predicted value. The noise prediction section 102 outputs a predicted noise signal to the cancellation section 103.

The noisy spectrum signals of respective m frequency channels outputted from the band division section 105 are inputted to the cancellation section 103, and the cancellation section 103 rejects or cancels noise of a prediction value predicted by the noise prediction section 102 in the inputted noisy spectrum signals of plural channels by subtracting the predicted noises from the noisy spectrum signals of plural channels for every channel. Then, the noise-canceled spectrum signals of plural channels are outputted to the band combining section 106.

Figure 12A:
FIGS. 12(a)-12(e) are diagrams showing waveforms for explaining another noise cancellation method on a frequency axis used in the preferred embodiments.
Figure 12B:
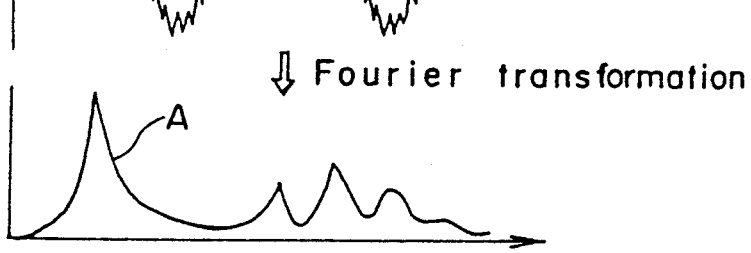
Figure 12C:
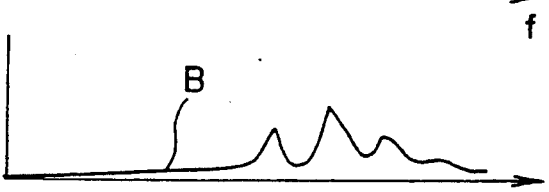
Figure 12D:
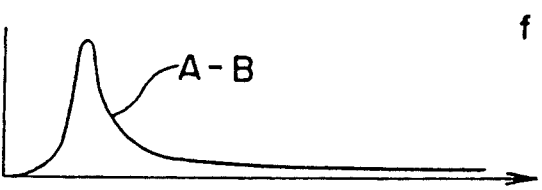
Figure 12E:
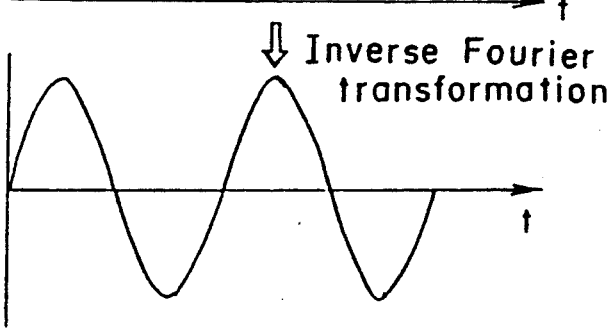

In the present preferred embodiment, there is used a cancellation method on a frequency axis shown in FIGS. 12(a)–12(e). Referring to FIGS. 12(a)–12(e), a noisy speech signal of FIG. 12(a) is Fourier-transformed into a spectrum signal of FIG. 12(b), and then, a spectrum of FIG. 12(c) of the predicted noise is subtracted from the converted spectrum signal of FIG. 12(b) so as to obtain the subtracted spectrum result of FIGS. 12(d). Further, the subtracted spectrum result of FIG. 12(d) is inverse-Fourier-transformed into a speech signal of FIG. 12(e) including no noise or a noise-suppressed speech signal of FIG. 12(e).

The band combining section 106 combines the spectrum signals of plural m channels outputted from the cancellation section 103, inverse-Fourier-transforms the combined spectrum signals into a noise-canceled speech signal, and outputs the noise-canceled speech signal to the speech extraction section 104. Finally, the speech extraction section 104 extracts a noise-canceled speech signal in response to the noise-canceled speech signal outputted from the band combining section 106 according to the detected speech signal interval outputted from the speech judgment section 112, and outputs it.

An operation of the signal processing apparatus of the fifth preferred embodiment will be described below.

A noisy speech signal is inputted to the band division section 105, and the band division process including the Fourier transformation is performed for the inputted noisy speech signal by the band division section 105. Then, the band-divided spectrum signals of plural m channels are outputted to the cepstrum analysis section 111, the noise prediction section 102 and the cancellation section 103. The cepstrum analysis section 111 performs the cepstrum analysis process for the inputted noisy spectrum signals of plural channels, and outputs the cepstrum analysis result to the speech judgment section 112. Thereafter, the speech judgment section 112 discriminates between a speech signal interval and a noise interval, and outputs a signal representing a speech signal interval thereof to the noise prediction section 102 and the speech cutting-out section 104. The noise prediction section predicts noise of plural channels in the noisy speech signal in response to the noisy spectrum signals of plural channels according to the detected speech signal interval outputted from the speech judgment section 112, and outputs the predicted noise of plural channels to the cancellation section 103.

The cancellation section 103 rejects or cancels the predicted noise from the noisy spectrum signals of plural channels by respective channels, and then, the noise-canceled spectrum signals of plural channels are outputted to the band combining section 106. The band combining section 106 combines the noise-canceled spectrum signals of plural channels, inverse-Fourier-transforms the combined spectrum signal into a noise-canceled speech signal, and outputs the transformed speech signal to the speech extraction section 104. The speech cutting-out section 104 extracts a noise-canceled speech signal from the transformed speech signal outputted from the band combining section 106 according to the detected speech signal interval outputted from the speech judgment section 112 by a word, by a syllable such as "a", "i", "u" etc. or by a phoneme, and outputs an extracted speech signal.

THE SIXTH PREFERRED EMBODIMENT

Figure 8:
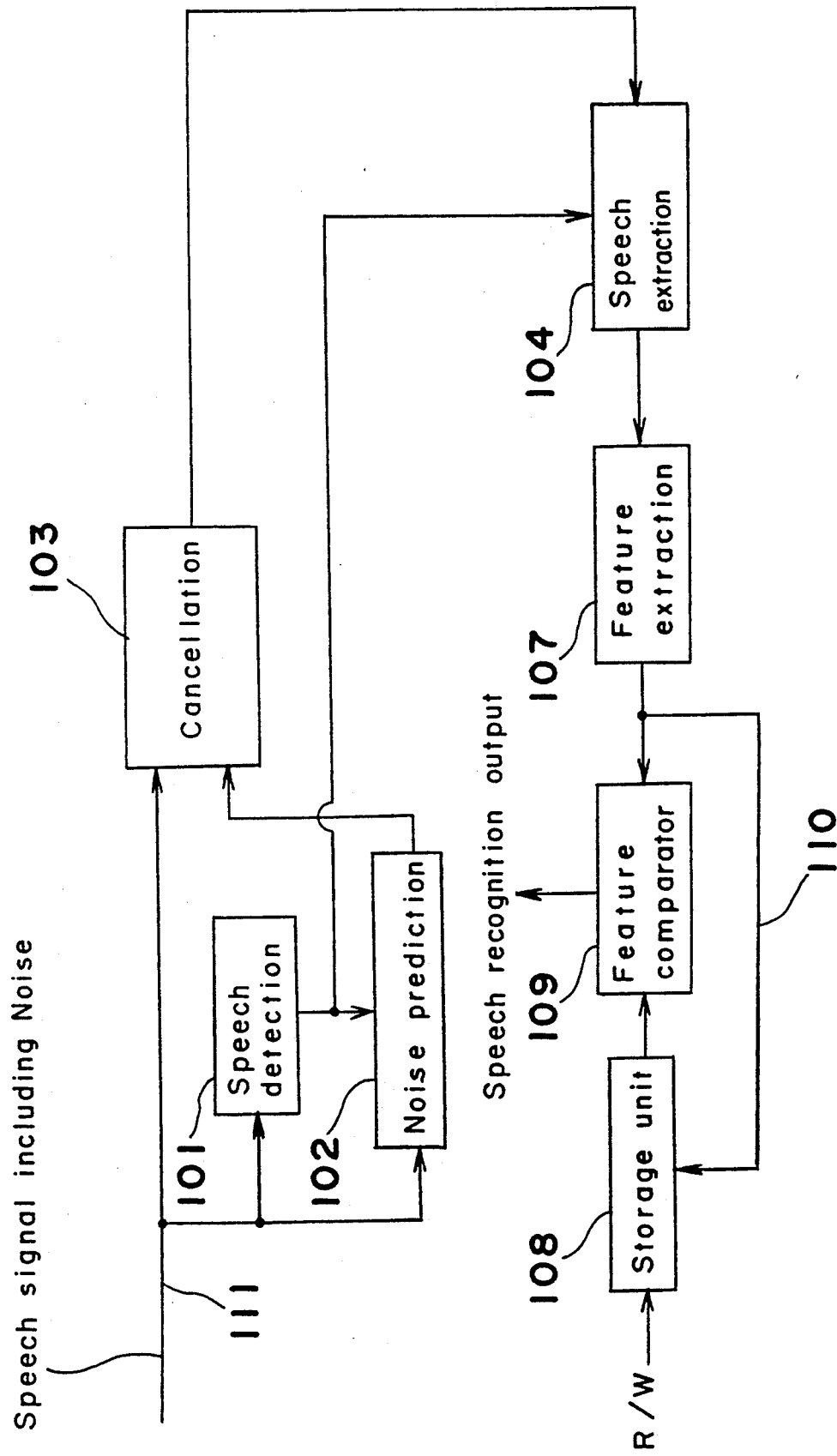
FIG. 8 is a schematic block diagram showing a speech recognition apparatus of a sixth preferred embodiment according to the present invention.

FIG. 8 shows a speech recognition apparatus of a sixth preferred embodiment according to the present invention. In FIG. 8, the same elements as those shown in FIGS. 2 and 6 are denoted by the same reference numerals as those shown in FIGS. 2 and 6.

The speech recognition apparatus of the sixth preferred embodiment is characterized in further comprising a feature extraction section 107, a storage unit 108 and a feature comparator 109 in addition to the fourth preferred embodiment shown in FIG. 6, and recognizes speech in response to the noise-canceled speech signal.

The feature extraction section 107, the storage unit 108 and the feature comparator 109 are constituted in manners similar to those of the feature extraction section 5, the storage unit 6 and the feature comparator 7, which are used in the second preferred embodiment shown in FIG. 2.

In the speech recognition apparatus of the sixth preferred embodiment constructed above, since speech is recognized in response to a speech signal which has been noise-canceled based on the predicted noise, the recognition rate can be increased.

THE SEVENTH PREFERRED EMBODIMENT

Figure 9:
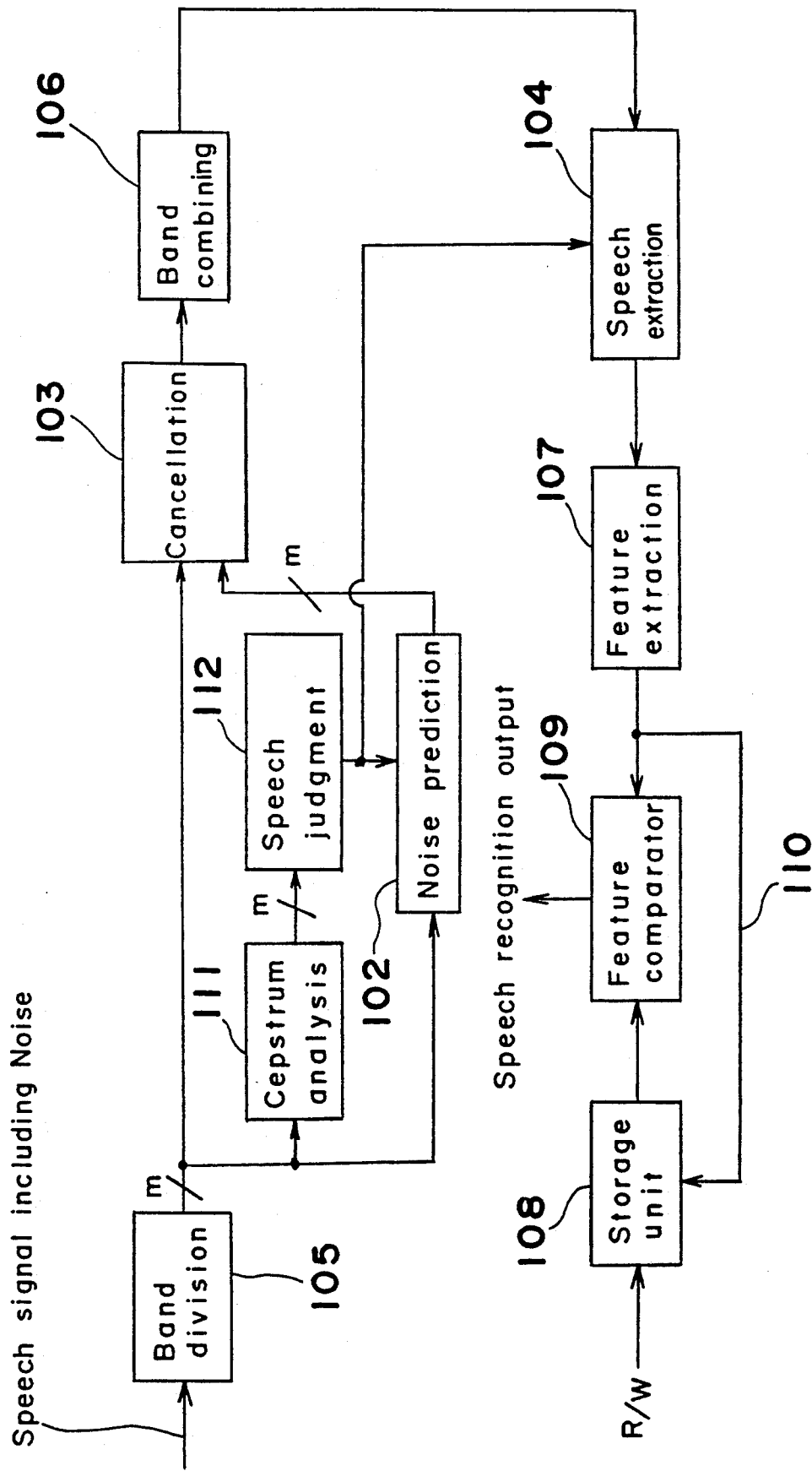
FIG. 9 is a schematic block diagram showing a speech recognition apparatus of a seventh preferred embodiment according to the present invention.

FIG. 9 shows a speech recognition apparatus of a seventh preferred embodiment according to the present invention. In FIG. 9, the same elements as those shown in FIGS. 2 and 7 are denoted by the same numerals as those shown in FIGS. 2 and 7.

The speech recognition apparatus of the seventh preferred embodiment is characterized in further comprising a feature extraction section 107, a storage unit 108 and a feature comparator 109 in addition to the fifth preferred embodiment shown in FIG. 7, and recognizes speech in response to the noise-canceled speech signal.

The feature extraction section 107, the storage unit 108 and the feature comparator 109 are constituted in manners similar to those of the feature extraction section 5, the storage unit 6 and the feature comparator 7, which are used in the second preferred embodiment shown in FIG. 2.

In the speech recognition apparatus of the seventh preferred embodiment constructed above, since a speech is recognized in response to a speech signal which has been noise-canceled based on the predicted noise, the recognition rate can be increased.

THE EIGHTH PREFERRED EMBODIMENT

Figure 13:
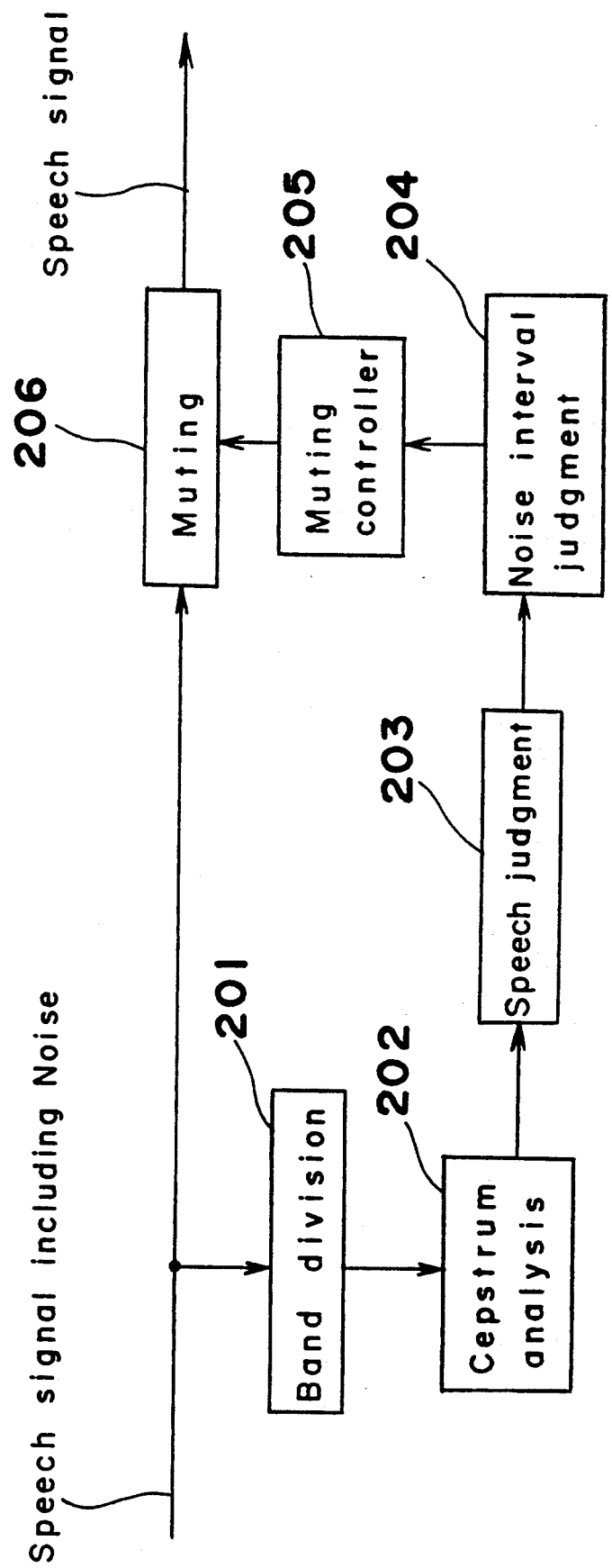
FIG. 13 is a schematic block diagram showing a signal processing apparatus of an eighth preferred embodiment according to the present invention.

FIG. 13 shows a signal processing apparatus of an eighth preferred embodiment according to the present invention.

The signal processing apparatus of the eighth preferred embodiment comprises a band division section 201, a cepstrum analysis section 202, a speech judgment section 203, a noise interval judgment section 204, a muting controller 205 and a muting section 206.

Figure 15:
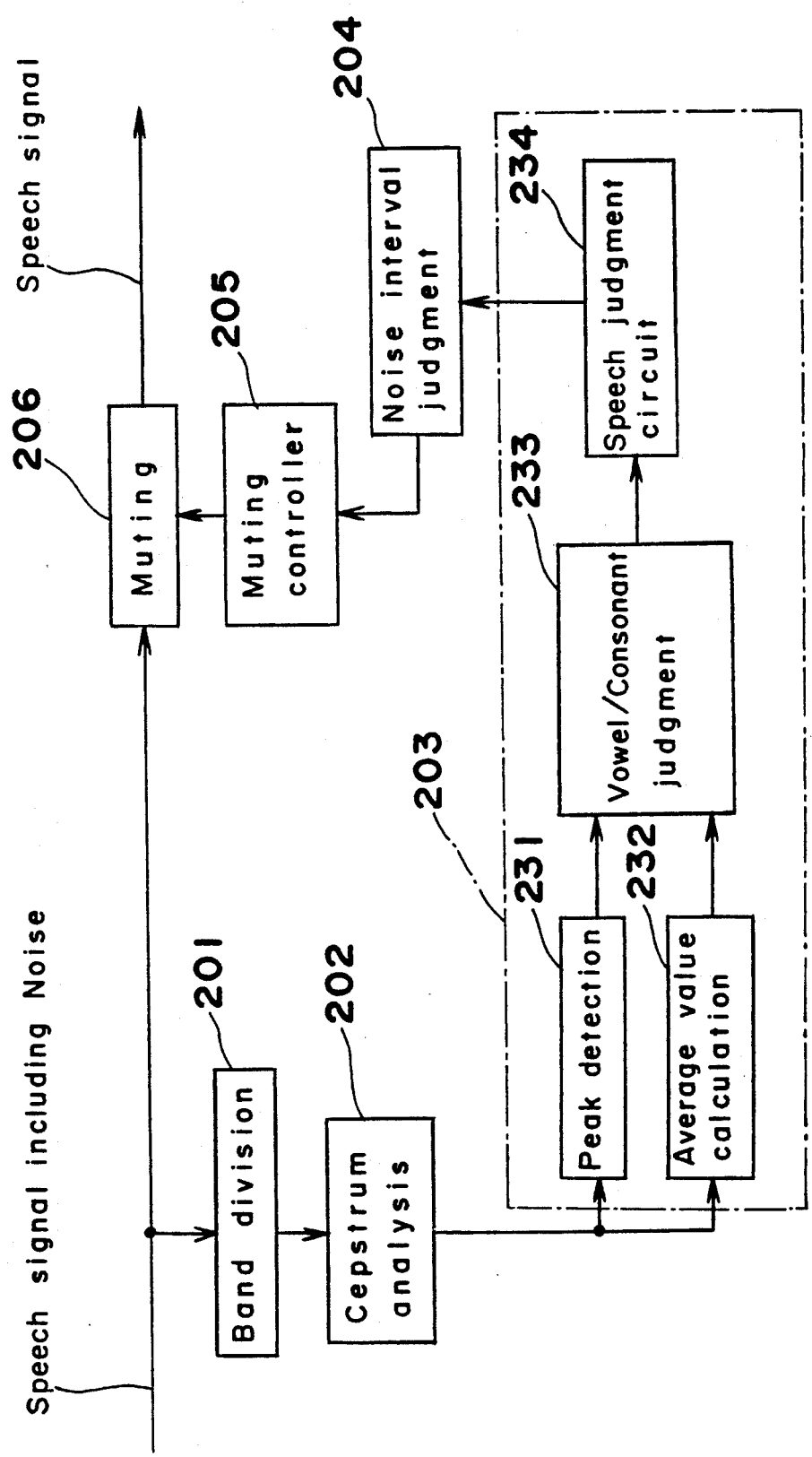
FIG. 15 is a schematic block diagram showing a signal processing apparatus of a preferred embodiment in the case of concretely showing a speech judgment section.

The band division section 201, the cepstrum analysis section 202 and the speech judgment section 203 are constituted in manners similar to those of the band division section 105, the cepstrum analysis section 111 and the speech judgment section 112, which are used in the fifth preferred embodiment shown in FIG. 7. Concretely, as shown in FIG. 15, the speech judgment section 203 comprises a peak detection section 231 for detecting a peak of the cepstrum obtained by the cepstrum analysis section 202, an average value calculation section 232 for calculating an average value of the cepstrum obtained by the cepstrum analysis section 202, a vowel/consonant judgment section 233 for detecting a vowel and/or a consonant in response to the peak of the cepstrum detected by the peak detection section 231 and the average value of the cepstrum calculated by the average value calculation section 232, and a speech judgment circuit 234 for detecting a speech signal interval in response to the detected vowel or the detected consonant outputted from the vowel/consonant judgment section 233 and outputting the detected speech signal interval to the noise interval judgment section 204.

The noise interval judgment section 204 detects a noise interval by inverting the speech signal interval detected by the speech judgment circuit 234 of the speech judgment section 203, and outputs the detected noise interval to the muting controller 205. The muting controller 205 generates and outputs a control signal representing the detected noise interval for representing the beginning and the end thereof to the muting section 206. The muting section 206 attenuates an inputted noisy speech signal only for the noise interval according to the control signal outputted from the muting controller 205, and outputs the noisy speech signal attenuated only for the noise interval.

THE NINTH PREFERRED EMBODIMENT

Figure 14:
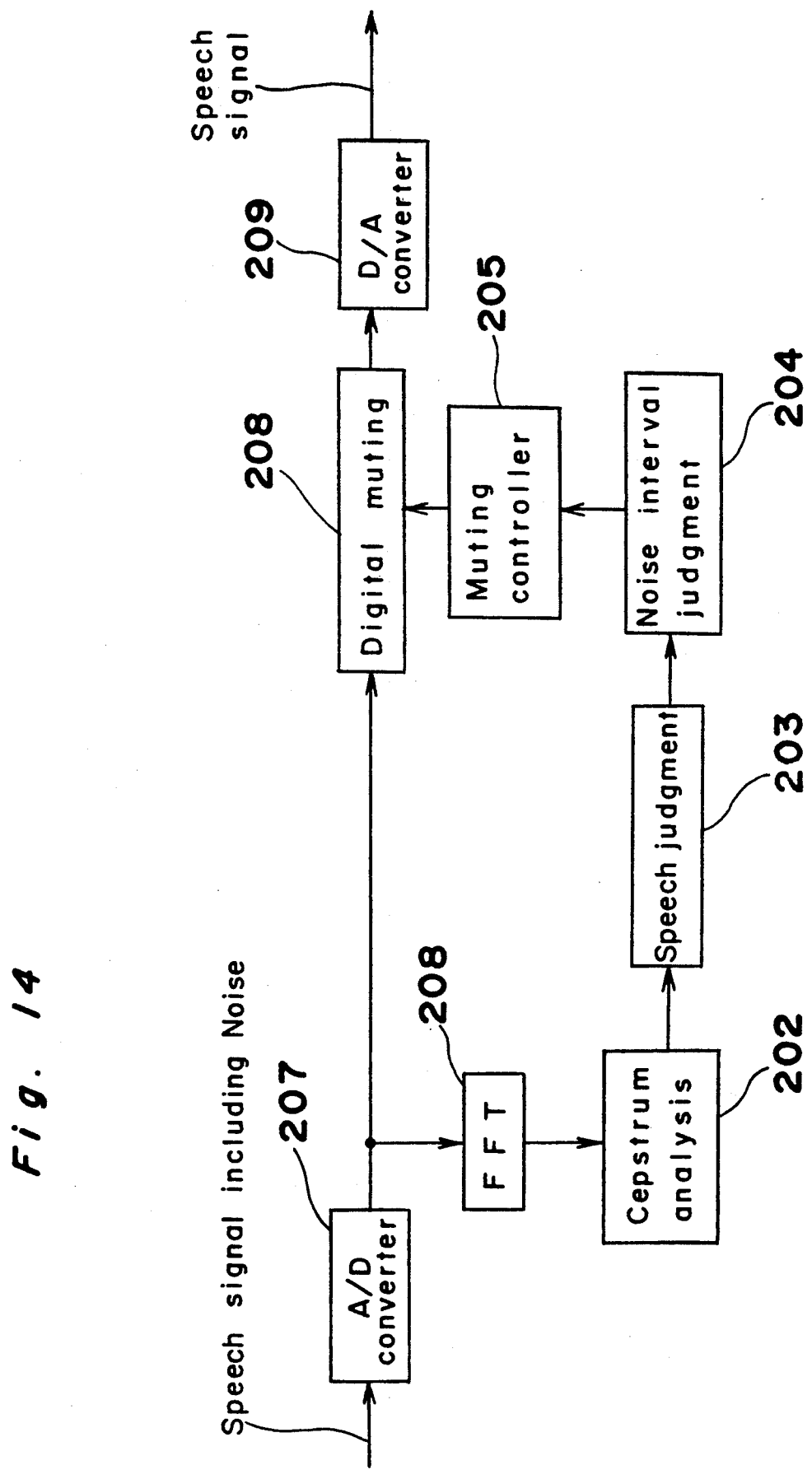
FIG. 14 is a schematic block diagram showing a signal processing apparatus of a ninth preferred embodiment according to the present invention.

FIG. 14 shows a signal processing apparatus of a ninth preferred embodiment according to the present invention. In FIG. 14, the same elements as those shown in FIG. 13 are denoted by the same references numerals as those shown in FIG. 13.

The signal processing apparatus of the ninth preferred embodiment is characterized in that all the signal processings are performed by digital signal processings. As compared with the eighth preferred embodiment shown in FIG. 8, the signal processing apparatus of the ninth preferred embodiment comprises an analog to digital converter 207 and a fast Fourier transformer (referred to as an FFT hereinafter) 208 instead of the band division section 201, and also comprises a digital muting section 208 and a digital to analog converter 209 instead of the muting section 206. Differences between the thirteenth and fourteenth preferred embodiments will be described below in detail.

The analog to digital converter 207 converts an inputted noisy speech signal into a digital noisy speech signal, and outputs the converted digital noisy speech signal to the FFT 208 and the digital muting section 208. The FFT 208 Fourier-transforms the A/D converted digital noisy speech signal into a spectrum signal, and outputs the transformed spectrum signal to the cepstrum analysis section 202.

The cepstrum analysis section 202, the speech judgment section 203, the noise interval judgment section 204 and the muting controller 205 are constituted in manners similar to those of the cepstrum analysis section 202, the speech judgment section 203, the noise interval judgment section 204 and the muting controller 205 which are used in the eighth preferred embodiment shown in FIG. 13.

The digital muting section 208 attenuates the digital spectrum signal outputted from the analog to digital converter 207 only for a noise interval detected by the noise interval judgment section 204 according to the control signal outputted from the muting controller 205. Further, the digital to analog converter 209 converts the digital spectrum signal outputted from the digital muting section 208 into an analog speech signal, whose level is attenuated only for the detected noise interval.

THE TENTH PREFERRED EMBODIMENT

Figure 16:
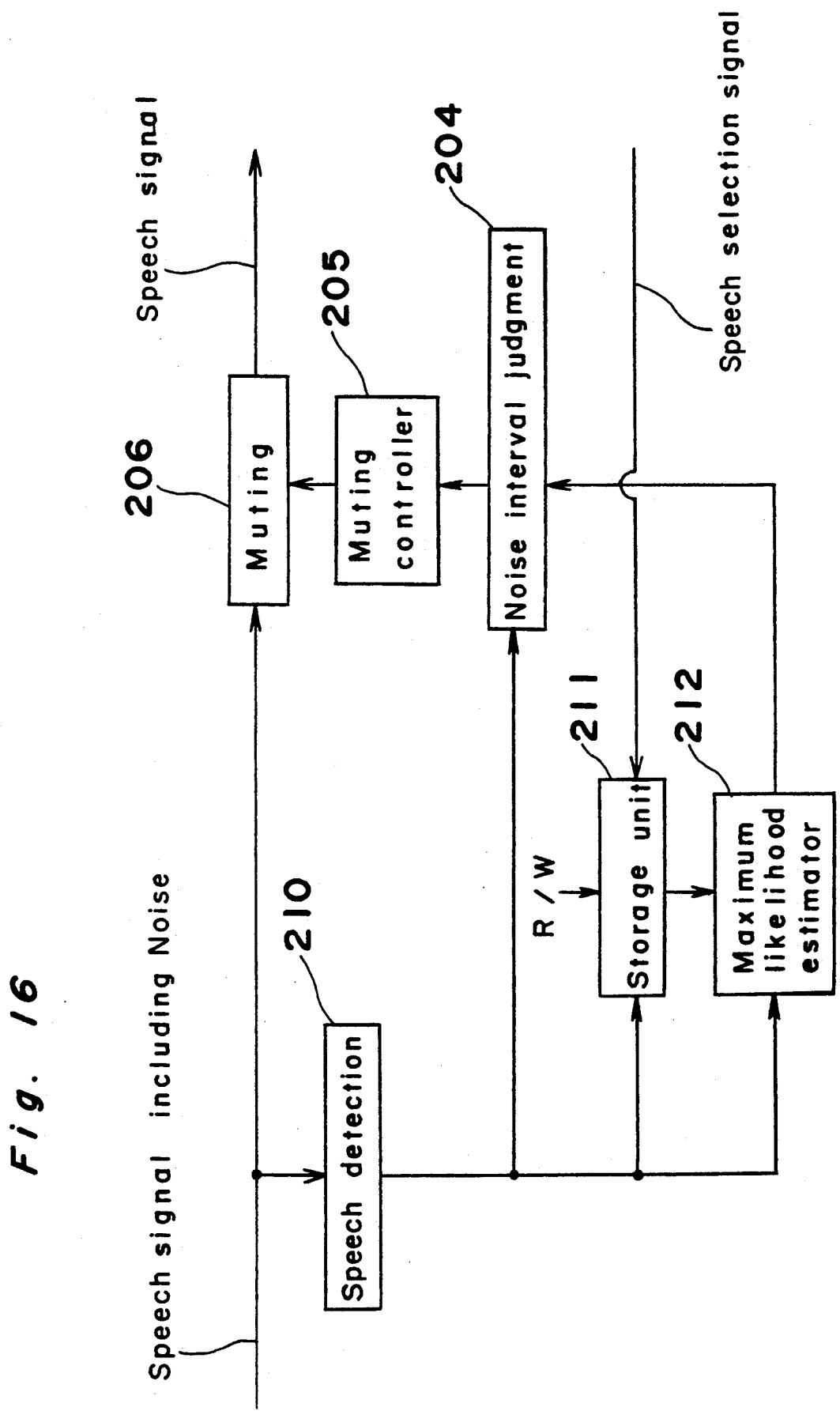
FIG. 16 is a schematic block diagram showing a signal processing apparatus of a tenth preferred embodiment according to the present invention.

FIG. 16 shows a signal processing apparatus of a tenth preferred embodiment according to the present invention. In FIG. 16, the same elements as those shown in FIG. 13 are denoted by the same reference numerals as those shown in FIG. 13.

The signal processing apparatus of the tenth preferred embodiment comprises a speech detection section 210, a storage unit 211, a maximum likelihood estimator 212, the noise interval judgment section 204, the muting controller 205 and the muting section 206. In the signal processing apparatus, the noise interval judgment section 204, the muting controller 205 and the muting section 206 are constituted in manners similar to those of the corresponding sections shown in FIG. 13.

The speech detection section 210 detects a speech signal in response to an inputted noisy speech signal. The speech detection section 210, for example, comprises the band division section 201, the cepstrum analysis section 202 and the speech judgment section 203. Alternatively, the speech detection section 210 may be constituted by a filter.

The storage unit 211 previously stores features of speech signals of plural speakers, and is constituted by a ROM. A speech selection signal for selecting features of a speech signal of a particular speaker is inputted to the storage unit 211. When a speech selection signal is inputted to the storage unit 211, the features of the speech signal of a particular speaker corresponding to the inputted speech selection signal are read out from the storage unit 211, and are outputted to the maximum likelihood estimator 212.

The maximum likelihood estimator 212 detects which speaker the speech signal detected by the speech detection section 210 corresponds to by comparing the speech signal detected by the speech detection section 210 with the features of the speech signal of the selected speaker outputted from the storage unit 211, and outputs the detection result to the noise interval section 204. In the maximum likelihood estimator 212, either a pattern matching method is used or a method for detecting a similarity between an amplitude level of the speech signal outputted from the speech signal detection section 210 and an amplitude level of the speech signal outputted from the storage unit 211 is used, or a method for detecting a similarity between a phase of the speech signal outputted from the speech signal detection section 210 and a phase of the speech signal outputted from the storage unit 211 is used. Thus, the maximum likelihood estimator 212 determines whether or not a speech signal now inputted to the signal processing apparatus corresponds to the speech signal of a selected speaker.

The noise interval judgment section 204 detects a noise interval in response to the speech signal outputted from the speech detection section 210 and the detection result outputted from the maximum likelihood estimator 212, discriminating between a speech signal of the selected speaker and a speech signal of one of the other speakers or a noise. The muting controller 205 and the muting section 206 operate in manners similar to those of corresponding sections shown in the eighth preferred embodiment of FIG. 13.

An operation of the signal processing apparatus of the tenth preferred embodiment will be described below in detail.

The features of the speech signals of plural speakers A, B, C, . . . are previously stored in the storage unit 211. For example, a speech selection signal for selecting a speech signal of the speaker A is inputted to the storage unit 211. Then, the features of the speech signal of the speaker A are outputted from the storage unit 211 to the maximum likelihood estimator 212.

Now, such a case is considered that the speaker A drives an automobile and another speaker gets on the automobile, and the speaker and driver A dials using his speech and talks using a handsfree telephone. Not only a noise such as a sound of an engine of the automobile but also a speech of the speaker B are added to the speech of the speaker A. Such a noisy speech signal is inputted to the speech detection section 210 and the muting section 206, and then, in response thereto, the speech detection section 210 detects a speech signal and outputs the detected speech signal to the noise interval judgment section 204, the storage unit 211 and the maximum likelihood estimator 212.

Further, the maximum likelihood estimator 212 determines whether or not the inputted speech signal corresponds to the speech signal of the speaker A, and outputs the judgment result to the noise interval judgment section 204. Therefore, when the detected speech signal is the speech of the speaker B, the maximum likelihood estimator 212 outputs a judgment result representing that the inputted speech signal is not the speech signal of the speaker A. On the other hand, when the detected speech signal is the speech of the speaker A, the maximum likelihood estimator 212 outputs a judgment result representing that the inputted speech signal is the speech signal of the speaker A.

In response to the speech signal detected by the speech detection section 210 and the judgment result outputted from the maximum likelihood estimator 212, the noise interval judgment section 204 detects a noise interval including a speech signal interval of the other speakers such as the speaker B, and outputs the detection result to the muting controller 205. It is to be noted that a time interval other than the detected noise interval is a speech signal interval of the speaker A. The muting controller 205 generates a control signal according to the detection result outputted from the noise interval judgment section 204, and outputs it to the muting section 206. The muting section 206 attenuates the inputted noisy speech signal only for the noise interval detected by the noise interval judgment section 204. Since not only a sound of an engine of the automobile but also a speech signal of the speakers other than the speaker A are attenuated by the muting section 206, the sufficiently noise-suppressed speech signal of the speaker A can be obtained. Therefore, if the output terminal of the signal processing apparatus is connected to a handsfree telephone with a speech dialing function, speech dialing and handsfree taking is performed without any error using the handsfree telephone.

THE ELEVENTH PREFERRED EMBODIMENT

Figure 17:
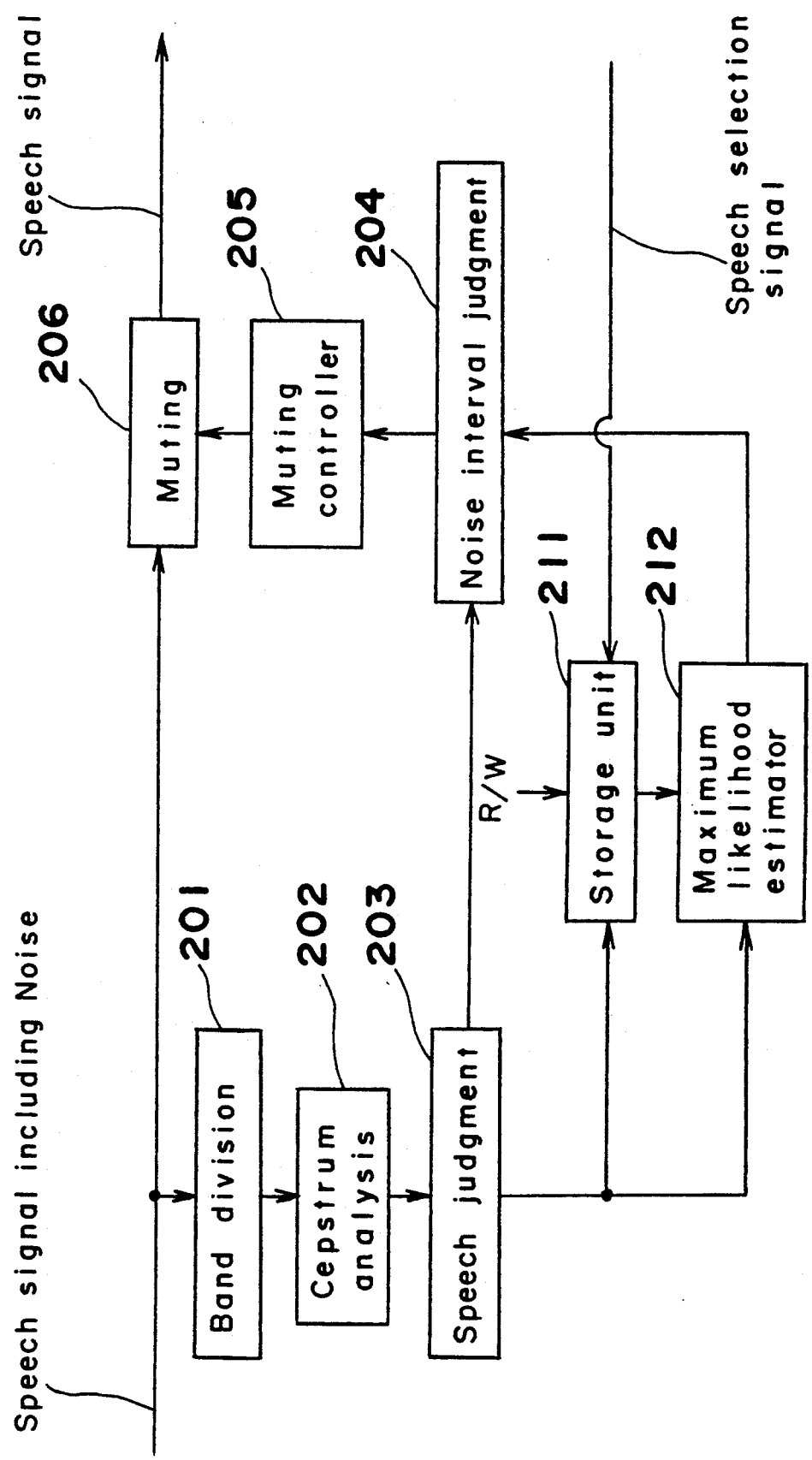
FIG. 17 is a schematic block diagram showing a signal processing apparatus of an eleventh preferred embodiment according to the present invention.

FIG. 17 shows a signal processing apparatus of an eleventh preferred embodiment according to the present invention. In FIG. 17 the same sections as those shown in FIGS. 13 and 16 are denoted by the same reference as those shown in FIGS. 13 and 16.

The signal processing apparatus of the eleventh preferred embodiment is characterized in further comprising the band division section 201, the cepstrum analysis section 202 and the speech judgment section 203 which are used in the eighth preferred embodiment shown in FIG. 13, instead of the speech detection section 210 of the tenth preferred embodiment shown in FIG. 16.

In the present preferred embodiment, cepstrum analysis is used, and as features of speech signals used in the storage unit 211 and the maximum likelihood estimator 212, a peak of a cepstrum, an average value of the cepstrum or a formant of the cepstrum are preferably used.

THE TWELFTH PREFERRED EMBODIMENT

Figure 18:
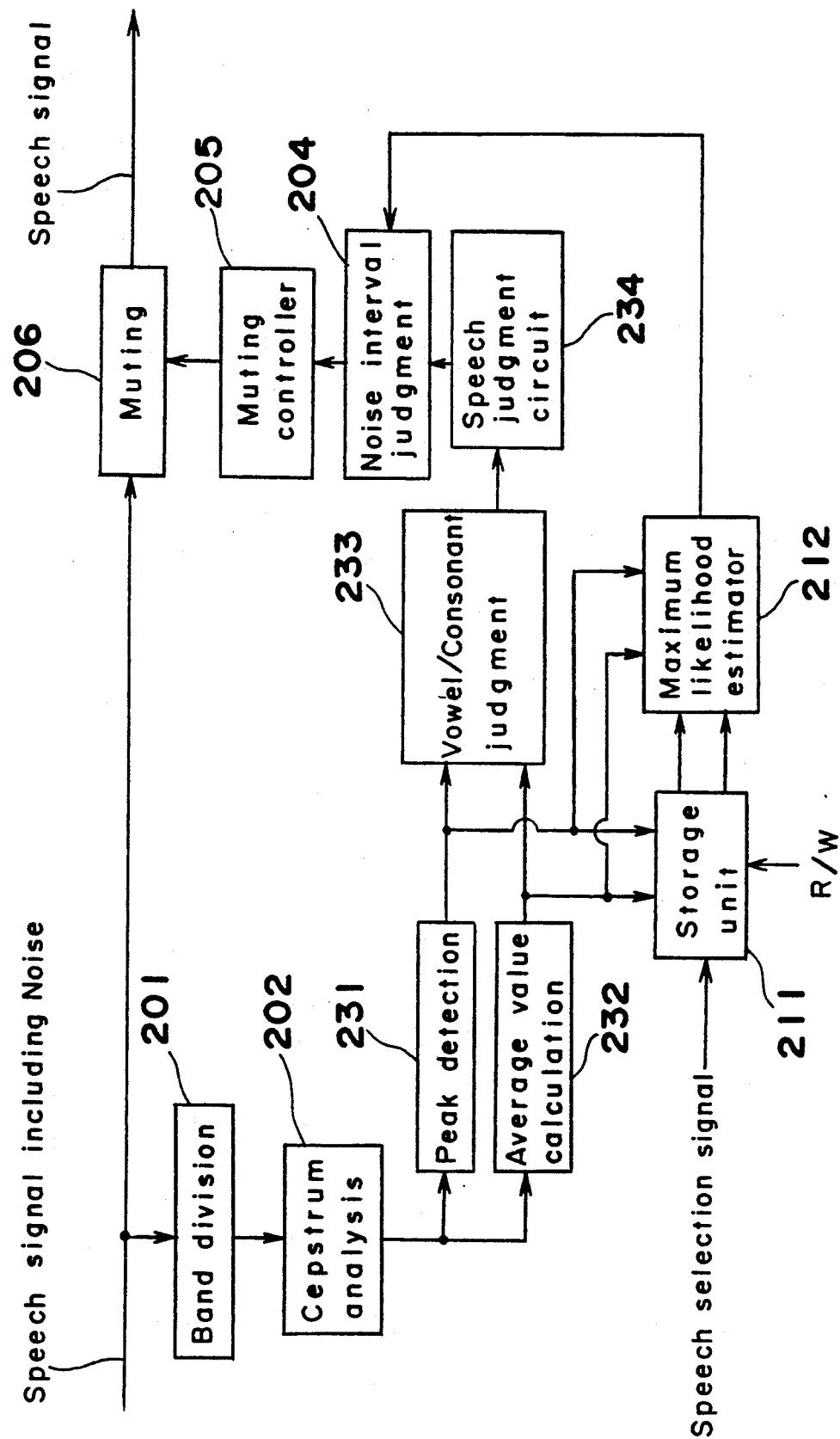
FIG. 18 is a schematic block diagram showing a signal processing apparatus of a twelfth preferred embodiment according to the present invention.

FIG. 18 shows a signal processing apparatus of an twelfth preferred embodiment according to the present invention. In FIG. 18, the same sections as those shown in FIGS. 16 and 17 are denoted by the same reference as those shown in FIGS. 15 and 17.

The signal processing apparatus of the twelfth preferred embodiment is characterized in that the speech judgment section 203 of the eleventh preferred embodiment shown in FIG. 17 comprises the peak detection section 231, the average value calculation section 232, the vowel/consonant judgment section 233 and the speech judgment circuit 234 which are used in the ninth preferred embodiment shown in FIG. 15.

In the preferred embodiment, since the vowels and/or the consonants are detected, a speech signal is detected more correctly.

THE THIRTEENTH PREFERRED EMBODIMENT

Figure 19:
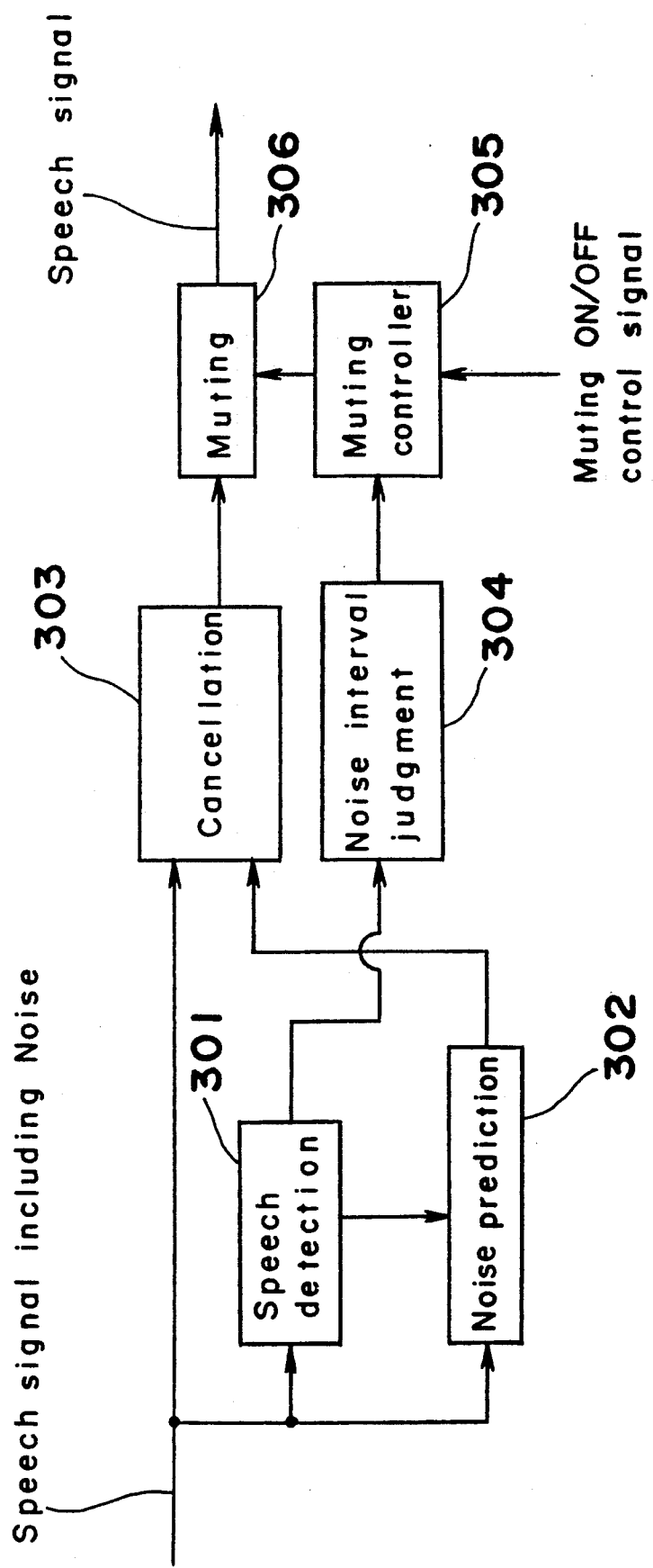
FIG. 19 is a schematic block diagram showing a signal processing apparatus of a thirteenth preferred embodiment according to the present invention.
Figure 20:
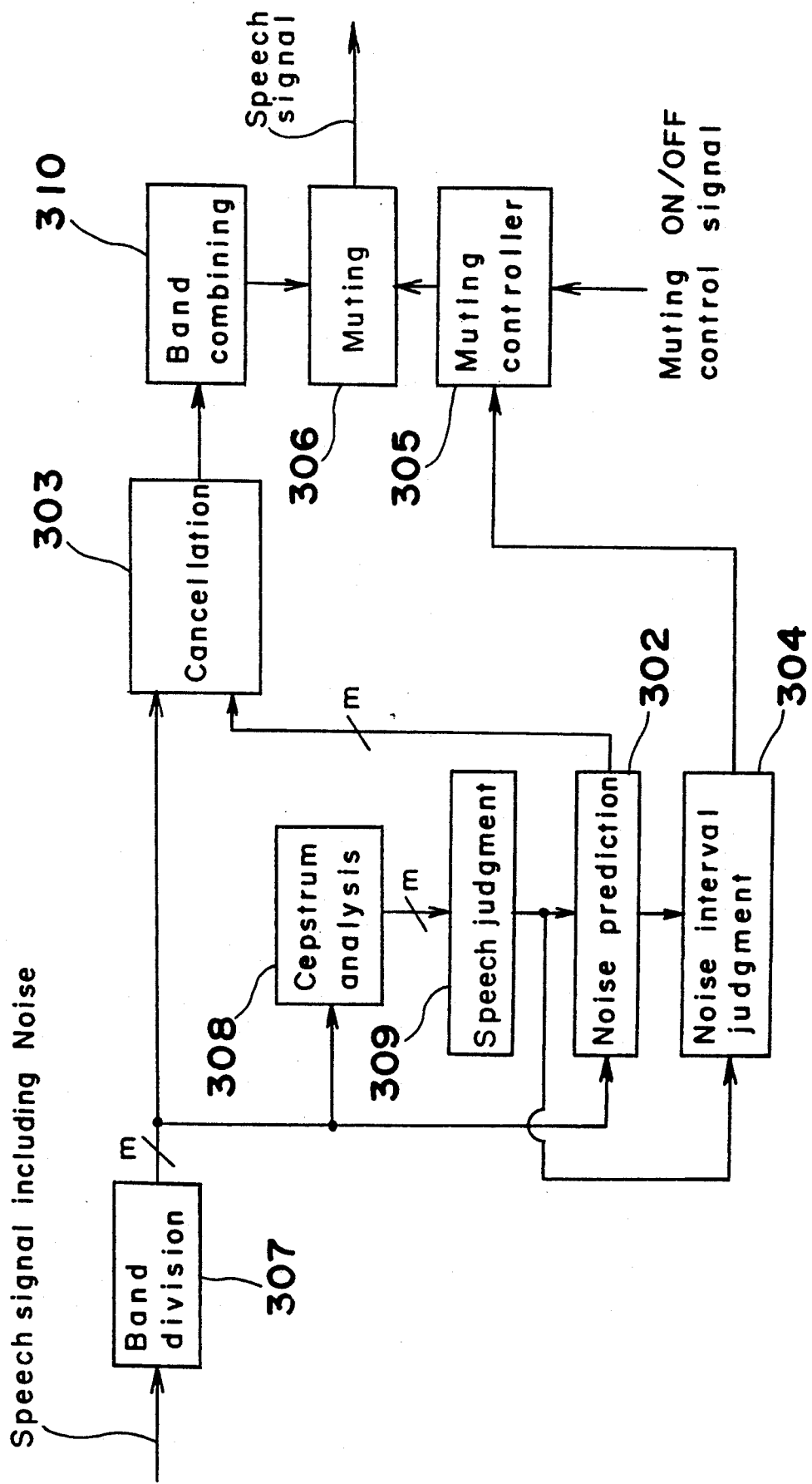
FIG. 20 is a schematic block diagram showing a signal processing apparatus of a concrete embodiment of a thirteenth preferred embodiment according to the present invention.

FIG. 19 shows a signal processing apparatus of a thirteenth preferred embodiment according to the present invention, and FIG. 20 shows a signal processing apparatus of a concrete embodiment of the thirteenth preferred embodiment shown in FIG. 19.

The signal processing apparatus of the thirteenth preferred embodiment comprises a speech detection section 301, a noise prediction section 302, a cancellation section 303, a noise interval judgment section 304, a muting controller 305 and a muting section 306.

The signal detection section 301, the noise prediction section 302 and the cancellation section 303 are constituted in manners similar to those of the signal detection section 101, the noise prediction section 102 and the cancellation section 103 which are used in the sixth preferred embodiment shown in FIG. 8. It is to be noted that the speech detection section 301, for example, as shown in FIG. 20, comprises a band division section 307, a cepstrum analysis section 308 and a speech judgment section 309 which are constituted in manners similar to those of the band division section 201, the cepstrum analysis section 202 and the speech judgment section 203 which are used in the seventh preferred embodiment shown in FIG. 9.

The noise interval judgment section 304, the muting controller 305 and the muting section 306 are constituted in manners similar to those of the noise interval judgment section 204, the muting controller 205 and the muting section 206 which are used in the tenth preferred embodiment shown in FIG. 16. It is to be noted that the muting controller 305 generates a control signal according to a noise interval detected by the noise interval judgment section 304 and a muting ON/OFF control signal which is manually set in an external apparatus and is outputted from the external apparatus. When an inputted signal is only composed of noise or when required for canceling noise upon processing a speech signal outputted from the signal is turned on. On the other hand, when noise is permitted upon processing a speech signal outputted from the signal processing apparatus, the muting ON/OFF control signal is turned OFF.

Further, the noise prediction section 304 detects noise intervals by respective m channels, and outputs the predicted noise intervals to the cancellation section 303. The cancellation section 303 cancels or rejects the predicted noise from the inputted noisy speech signal, and outputs a noise-cancelled speech signal to the muting section 306. A band combining section 310 shown in FIG. 20 combines the noise-canceled spectrum signals of plural m channels, inverse-Fourier-forms the combined spectrum signal into a noise-canceled speech signal, and outputs a noise-canceled speech signal.

The muting section 306 attenuates the noise-canceled speech signal outputted from the cancellation section 303 shown in FIG. 19 or outputted from the band combining section 310 shown in FIG. 20, only for the noise interval detected by the noise interval judgment section 304, according to the control signal outputted from the muting controller 305.

THE FOURTEENTH PREFERRED EMBODIMENT

Figure 21:
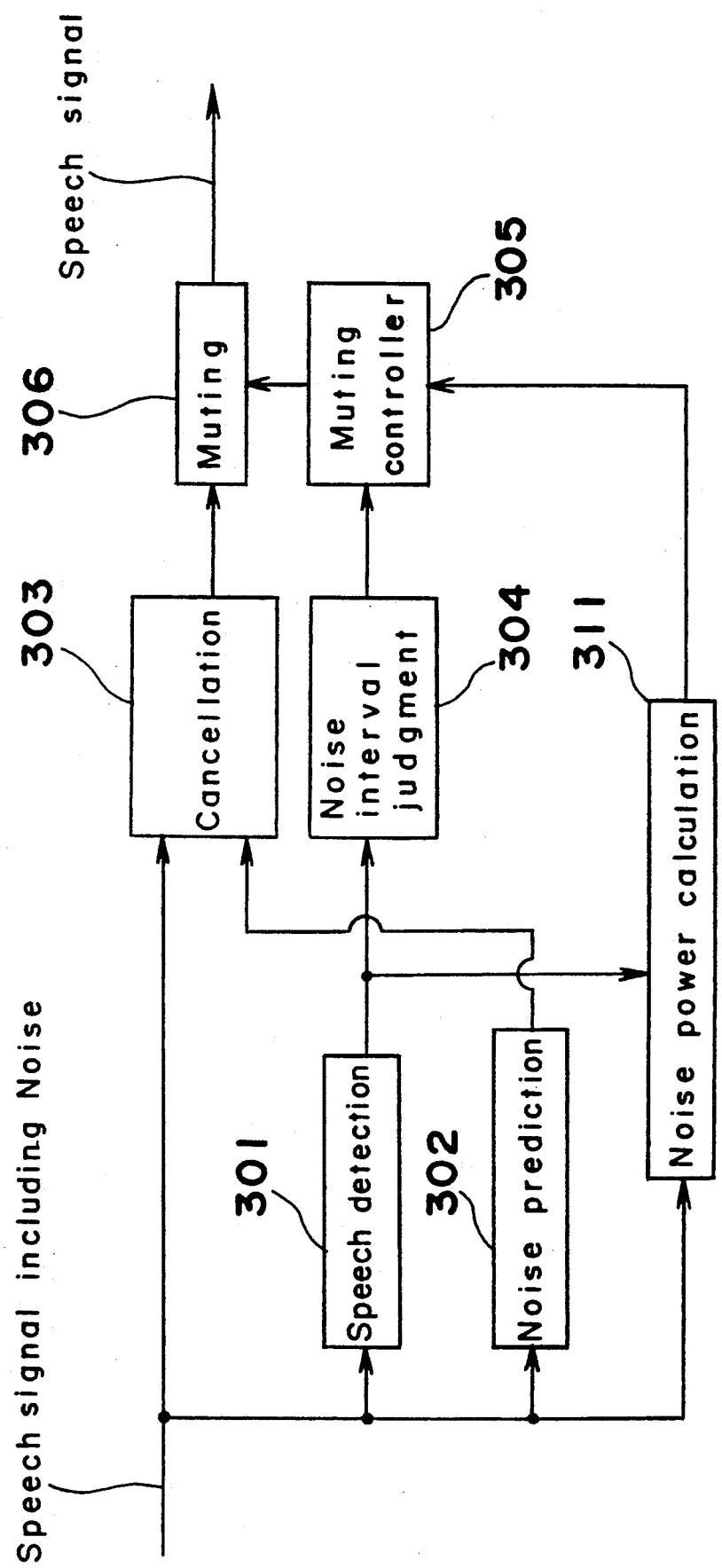
FIG. 21 is a schematic block diagram showing a signal processing apparatus of a fourteenth preferred embodiment according to the present invention.
Figure 22:
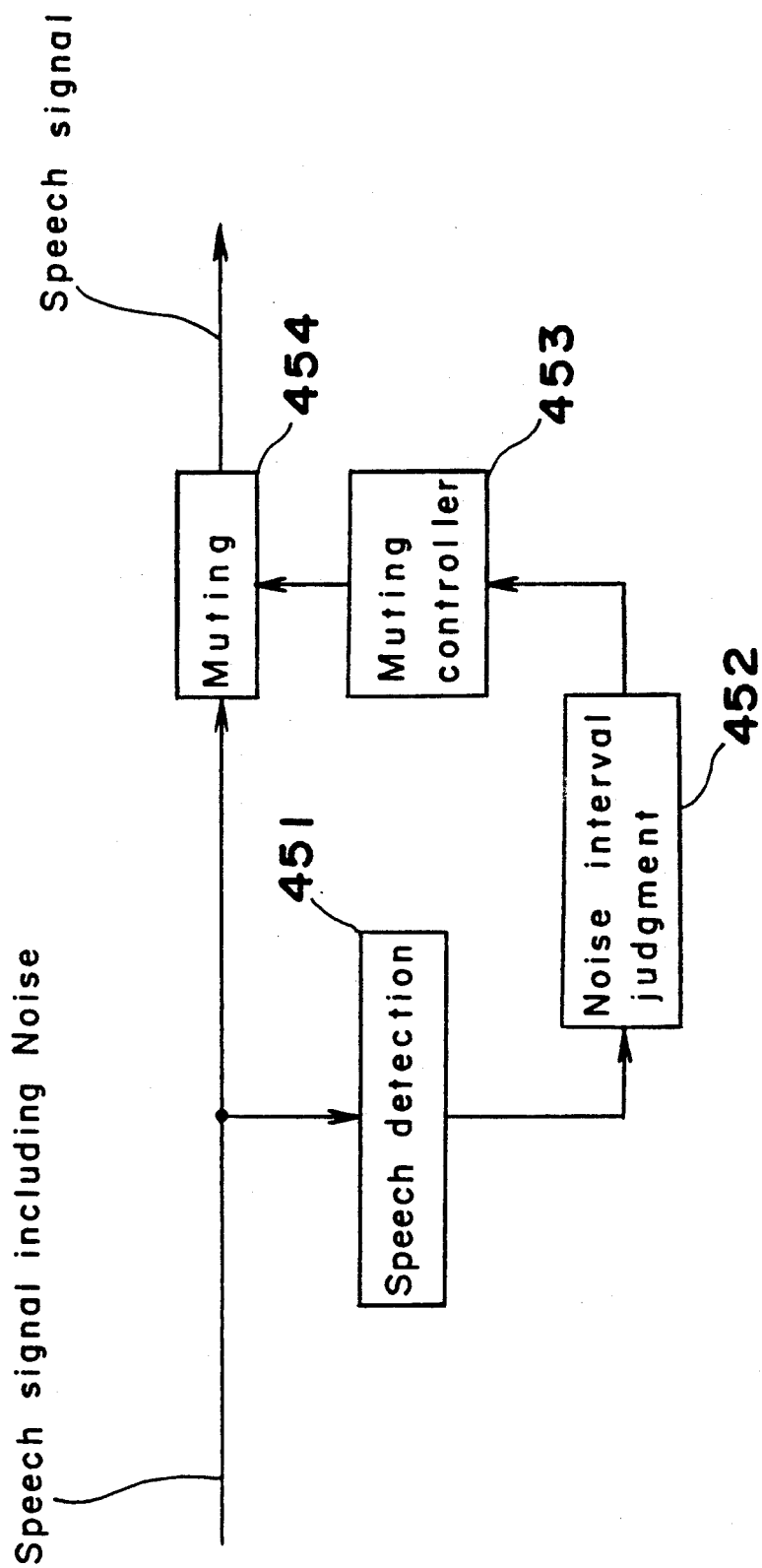
FIG. 22 is a schematic block diagram showing a conventional signal processing apparatus.

FIG. 21 is a schematic block diagram showing a signal processing apparatus of a fourteenth preferred embodiment according to the present invention. In FIG. 21, the same elements as those shown in FIG. 19 are denoted by the same reference numerals as those shown in FIG. 19.

The signal processing apparatus of the fourteenth preferred embodiment is characterized in further comprising a noise power calculation section 311 in addition to the thirteenth preferred embodiment shown in FIG. 19. An inputted noisy speech signal is inputted to the noise power calculation section 311, and also a speech signal detected by the speech detection section 301 is inputted to the noise power calculation section 311. Then, the noise power calculation section 311 calculates power of a noise included in the inputted noisy speech signal, and outputs the calculated power of the noise to the muting controller 305. According to the calculated power of the noise outputted from the noise power calculation section 311, the muting controller 305 generates a control signal representing whether or not the inputted noisy speech signal is to be attenuated depending on the calculated power of the noise outputted from the noise power calculation section 311, and outputs it to the muting section 306. For example, when the calculated power of the noise is larger than a predetermined threshold value, the inputted noisy speech signal is attenuated by the muting section 306. On the other hand, when the calculated power of the noise is equal to or smaller than the above predetermined threshold value, the inputted noisy speech signal is outputted as it is without attenuating it by the muting section 306.

THE OTHER PREFERRED EMBODIMENTS

In the above-mentioned preferred embodiments, the cepstrum analysis section, the speech cutting-out section, the maximum likelihood estimator, the noise interval judgment section, the noise prediction section, the speech detection section, the muting section and the cancellation section are constituted utilizing a computer by software. However, these sections can be constituted by hardware used only for these sections.

Although the present invention has been fully described in connection with the preferred embodiments thereof with reference to the accompanying drawings, it is to be noted that various changes and modifications are apparent to those skilled in the art. Such changes and modifications are to be understood being included within the scope of the present invention as defined by the appended claims unless they depart therefrom.

What is claimed is:

1. A signal processing apparatus comprising:
   a band division means for performing a band division process including a Fourier transformation for an inputted speech signal and for outputting spectrum signals of plural channels;
   a cepstrum analysis means for performing a cepstrum analysis process for the spectrum signals of plural analysis channels outputted from said band division means and for outputting a cepstrum analysis result;
   a speech judgment means for detecting a speech signal interval of the inputted noisy speech signal in response to the cepstrum analysis result outputted from said cepstrum analysis means and for outputting the detected speech signal interval; and
   a speech extracting means for extracting a speech signal from the inputted noisy speech signal according to the detected speech signal interval outputted from said speech judgment means, and for outputting the extracted speech signal;
   wherein said speech judgment means comprises:
   a peak detection means for detecting a peak of a cepstrum in response to the cepstrum analysis result outputted from said cepstrum analysis means;
   an average value calculation means for calculating an average value of the cepstrum in response to the cepstrum analysis result outputted from said cepstrum analysis means, and for outputting the calculated average value of the cepstrum; and
   a speech judgment circuit for detecting a speech signal interval in response to the detected peak of the cepstrum outputted from said peak detection means and the calculated average value of the cepstrum outputted from said average value calculation means;
   wherein said signal processing apparatus further comprises:
   a feature extraction means for extracting a speech feature from the extracted speech signal outputted from said speech extracting means, and for outputting the extracted speech feature;
   a storage means for initially storing standard speech features of plural speakers; and
   a feature comparison means for recognizing speech by comparing the extracted speech features outputted from said feature extraction means with the standard speech features stored in said storage means.

2. A signal processing apparatus comprising:
   a speech detection means for detecting a speech signal in response to an inputted noisy speech signal, and for outputting the detected speech signal;
   a noise prediction means for predicting speech noise in response to the inputted noisy speech signal according to the detected speech signal outputted from said speech detection means, and for outputting the predicted noise;
   a cancellation means for cancelling the predicted noise outputted from said noise prediction means from the inputted noisy speech signal, and for outputting the noise-canceled speech signal; and
   a speech extracting means for extracting a speech signal from the noise-canceled speech signal outputted from said cancellation means according to the detected speech signal outputted from said speech detection means.

3. The signal processing apparatus as claimed in claim 2, further comprising:
   a band division means for performing a band division process including a Fourier transformation for an inputted speech signal and for outputting spectrum signals of plural channels to said cancellation means; and
   a band combining means for combining the noise-canceled spectrum signals of plural channels outputted from said cancellation means, inverse-Fourier-transforming the combined spectrum signal into a transformed speech signal, and for outputting the transformed speech signal to said speech cutting-out means;
   wherein said speech detection means comprises:
   a cepstrum analysis means for performing a cepstrum analysis process for the spectrum signals of plural channels outputted from said band division means, and for outputting the cepstrum analysis result; and
   a speech judgment means for detecting a speech signal in response to the cepstrum analysis result outputted from said cepstrum analysis means, and for outputting the detected speech signal interval.

4. The signal processing apparatus as claimed in claim 2, further comprising:
   a feature extraction means for extracting a speech feature from the extracted speech signal outputted from said speech extracting means, and for outputting the extracted speech feature;
   a storage means for initially storing standard speech features of plural speakers; and
   a feature comparison means for recognizing speech by comparing the extracted speech features outputted from said feature extraction means with the standard speech features stored in said storage means.

5. The signal processing apparatus as claimed in claim 3, further comprising:
   a feature extraction means for extracting a speech feature from the extracted speech signal outputted from said speech extracting means, and for outputting the extracted speech feature;
   a storage means for initially storing standard speech features of plural speakers; and
   a feature comparison means for recognizing speech by comparing the extracted speech features outputted from said feature extraction means with the standard speech features stored in said storage means.

6. A signal processing apparatus comprising:
   an analog to digital convering means for converting an inputted noisy analog speech signal into a noisy digital speech signal, and for outputting the converted noisy digital speech signal;
   a Fourier transformation means for Fourier-transforming the converted noisy digital speech outputted from said analog to digital converting means into a transformed noisy digital spectrum signal, and for outputting the transformed noisy digital spectrum signal;

a cepstrum analysis means for performing a cepstrum analysis process for the transformed noisy digital spectrum signal outputted from said Fourier transformation means, and for outputting the cepstrum analysis result;

a speech judgment means for detecting a speech signal interval in response to the cepstrum analysis result outputted from said cepstrum analysis means, and for outputting the detected speech signal interval;

a noise interval judgement means for detecting a noise interval in response to the detected speech signal interval outputted from said speech judgment means;

a muting means for attenuating the converted noisy digital speech signal only for the detected noise interval outputted form said noise interval judgment means according to the detected noise interval outputted from the noise interval judgement means, and for outputting the digital speech signal attenuated only for the detected noise interval; and a digital to analog converting means for converting the digital speech signal outputted from said muting means into an analog speech signal;

wherein said speech judgment means comprises:

a peak detection means for detecting a peak of a cepstrum in response to the cepstrum analysis result outputted from said cepstrum analysis means, and for outputing the detected peak of the cepstrum;

an average value calculation means for calculating an average value of the cepstrum in response to the cepstrum analysis result outputted from said cepstrum analysis means, and for outputting the calculated average value; a vowel and consonant judgment means for detecting a vowel in response to the detected peak of the cepstrum outputted from said peak detection means and for detecting a consonant in response to the calculated average value outputted from said average value calculation means, and for outputting the detection result; and a speech judgment circuit for detecting a speech signal interval in response to the detection result outputted from said vowel and consonant judgment means, and for outputting the detected speech signal interval.

7. A signal processing apparatus comprising:

a band division means for performing a band division process including a Fourier transformation for an inputted speech signal and for outputting spectrum signals of plural channels;

a cepstrum analysis means for performing a cepstrum analysis process for the spectrum signals of plural channels outputted from said band division means and for outputting a cepstrum analysis result;

a speech judgment means for detecting a speech signal interval in response to the cepstrum analysis result outputted from said cepstrum analysis mean, and for outputting the detected speech signal interval;

a noise interval judgment means for detecting a noise interval in response to the detected speech signal interval outputted from said speech judgment means; and a muting means for attenuating the inputted noisy speech signal only for the detected noise interval outputted from said noise interval judgment means according to the detected noise interval outputted from said noise interval judgement means, and for outputting the speech signal attenuated only for the detected noise interval;

wherein said speech judgment means comprises:

a peak detection means for detecting a peak of a cepstrum in response to the cepstrum analysis result outputted from said cepstrum analysis means, and for outputting the detected peak of the cepstrum;

an average value calculation means for calculating an average value of a cepstrum in response to the cepstrum analysis result outputted from said cepstrum analysis means, and for outputting the calculated average value;

a vowel and consonant judgment means for detecting a vowel in response to the detected peak of the cepstrum outputted from said peak detection means and detecting a consonant in response to the calculated average value outputted from said average value calculation means, and for outputting the detection result; and a speech judgment circuit for detecting a speech signal interval in response to the detection result outputted from said vowel and consonant judgment means, and for outputting the detected speech signal interval.

8. A signal processing apparatus comprising:

a storage means for initially storing speech features of plural speakers;

a speech detection means for detecting a speech signal in response to an inputted noisy speech signal, and for outputting the detected speech signal interval;

a maximum likelihood estimation means for detecting a kind of speech by comparing eh detected feature of the speech signal outputted from said speech detection means with the speech features of plural speakers stored in said storage means, and for outputting the detected kind of speech;

a noise interval judgment means for detecting a noise interval in response to the detected kind of speech outputted from said maximum likelihood estimation means and the detected speech signal interval outputted from said speech detection means, and for outputting the detection noise interval; and a muting means for attenuation the inputted noisy speech signal only for the detected noise interval outputted from said noise interval judgment means according to the detected noise interval outputted rom said noise interval judgment means, and for outputting the speech signal attenuated only for the detected noise interval.

9. The signal processing apparatus as claimed in claim 8, wherein said speech detection means comprises:

a band division means for performing a band division process including a Fourier transformation for an inputted speech signal and for outputting spectrum signals of plural channels;

a cepstrum analysis means for performing a cepstrum analysis process for the spectrum signals of plural channels outputted from said band division means and for outputting a cepstrum analysis result;

a speech judgment means for detecting a speech signal in response to the cepstrum analysis result outputted from said cepstrum analysis means, and for outputting the detected speech signal interval.

10. The signal processing apparatus as claimed in claim 9, wherein said speech judgment means comprises:
- a peak detection means for detecting a peak of a cepstrum in response to the cepstrum analysis result outputted from said cepstrum analysis means, and for outputting the detected peak of the cepstrum to said maximum likelihood estimation means;
- an average value calculation means for calculating an average value of the cepstrum in response to the cepstrum analysis result outputted from said cepstrum analysis means, and for outputting the calculated average value to said maximum likelihood estimation means;
- a vowel and consonant judgment means for detecting a vowel in response to the detected peak of the cepstrum outputted from said peak detection means and for detecting a consonant in response to the calculated average value outputted from said average value calculation means, and for outputting the detection result; and
- a speech judgment circuit for detecting a speech signal in response to the detection result outputted from said vowel and consonant judgment means, and for outputting the detected speech signal interval;
- wherein the speech features of plural speakers stored in said storage means and the speech features compared by said maximum likelihood estimation means are peaks of the cepstrum and average values of the cepstrums.

11. A signal processing apparatus comprising:
- a speech detection means for detecting a speech signal interval in response to an inputted noisy speech signal and for outputting the detected speech signal interval;
- a noise interval judgement means for detecting a noise interval in response to the detected speech signal interval outputted from said speech detection means, and for outputting the detected noise interval;
- a noise prediction means for predicting a noise of the inputted noisy speech signal interval in response to the detected noise interval outputted from said noise interval judgment means, and for outputting the predicted noise;
- a cancellation means for canceling the predicted noise outputted from said noise prediction means in the inputted noisy speech signal and for outputting a nose-canceled speech signal; and
- a muting means for attenuating the noise-canceled speech signal outputted form said cancellation means, only for the detected noise interval outputted from said noise interval judgment means with a predetermined attenuation value according to the detecting noise interval outputted from said noise interval judgment means, and for outputting the speech signal attenuated only for the detected noise interval.

12. The signal processing apparatus as claimed in claim 11, further comprising a noise power calculation means for calculating a power of a noise in response to the inputted noisy speech signal and the detected speech signal interval outputted from said speech detection means and for outputting the calculated power of the noise to said muting means;
- wherein the attenuation value of said muting means is altered depending on the calculated power of the noise outputted from said noise power calculation means.

13. A signal processing apparatus comprising:
- a band division means for performing a band division process including a Fourier transformation for an inputted speech signal and for outputting spectrum signals of plural channels;
- a cepstrum analysis means for performing a cepstrum analysis process for the spectrum signals of plural channels outputted from said band division means, and for outputting the cepstrum analysis result;
- a speech judgment means for detecting a speech signal interval in response to the cepstrum analysis result outputted from said cepstrum analysis means, and for outputting the detected speech signal interval;
- a noise interval judgement means for detecting a noise interval in response to the detected speech signal interval outputted from said speech judgment means, and for outputting the detected noise interval;
- a noise prediction means for predicting noise of the spectrum signals of plural channels outputted from said band division means in response to the detected noise interval outputted from said noise interval judgement means, and for outputting the predetected noise of plural channels;
- a cancellation means for canceling the predicted noise of plural channels outputted form said noise prediction means in the spectrum signals of plural channels outputted from said band division means, and for outputting noise-canceled spectrum signals of plural channels;
- a band combining means for combining the noise-canceled spectrum signals of plural channels, inverse-Fourier-transforming the combined spectrum signal into a transformed speech signal, and for outputting the transformed speech signal; and
- a muting means for attenuating the transformed speech signal outputted from said band combining means, only for the detected noise interval outputted from said noise interval judgment means with a predetermined attenuation value according to the detected noise interval outputted from said noise interval judgment means, and for outputting the speech signal attenuated only for the detected noise interval.

* * * * *

UNITED STATES PATENT AND TRADEMARK OFFICE
CERTIFICATE OF CORRECTION

PATENT NO. : 5,220,610
DATED : June 15, 1993
INVENTOR(S) : Joji KANE et al.

It is certified that error appears in the above-identified patent and that said Letters Patent is hereby corrected as shown below:

Cover page, section [75], change "Joi" to --Joji--.

Signed and Sealed this

Fifteenth Day of March, 1994

Attest:

BRUCE LEHMAN

Attesting Officer     Commissioner of Patents and Trademarks